US007743348B2

(12) United States Patent
Robbins et al.

(10) Patent No.: US 7,743,348 B2
(45) Date of Patent: Jun. 22, 2010

(54) USING PHYSICAL OBJECTS TO ADJUST ATTRIBUTES OF AN INTERACTIVE DISPLAY APPLICATION

(75) Inventors: Daniel C. Robbins, Seattle, WA (US);
Steven M. Drucker, Bellevue, WA (US);
Andrew D. Wilson, Seattle, WA (US);
Kristen Nilsen Nye, Duvall, WA (US);
Joel P. Dehlin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 879 days.

(21) Appl. No.: 10/883,515

(22) Filed: Jun. 30, 2004

(65) Prior Publication Data

US 2006/0001650 A1 Jan. 5, 2006

(51) Int. Cl.
*G06F 3/033* (2006.01)
*G06F 3/01* (2006.01)
(52) U.S. Cl. .................. 715/863; 715/767; 715/773; 715/810; 715/839
(58) Field of Classification Search ................ 715/863, 715/767, 773, 810, 839
See application file for complete search history.

(56) References Cited

U.S. PATENT DOCUMENTS

| 4,346,376 | A |   | 8/1982  | Mallos |
|-----------|---|---|---------|--------|
| 4,561,017 | A |   | 12/1985 | Greene |
| 4,914,624 | A | * | 4/1990  | Dunthorn ................. 345/173 |
| 4,992,650 | A |   | 2/1991  | Somerville ............... 235/462 |
| 5,155,813 | A |   | 10/1992 | Donoghue |
| 5,319,747 | A | * | 6/1994  | Gerrissen et al. ......... 715/839 |
| 5,347,620 | A |   | 9/1994  | Zimmer |
| 5,483,261 | A | * | 1/1996  | Yasutake ................... 345/173 |
| 5,488,204 | A |   | 1/1996  | Mead |
| 5,570,281 | A |   | 10/1996 | Berry |
| 5,638,093 | A |   | 6/1997  | Takahashi |
| 5,646,650 | A |   | 7/1997  | Miller |
| 5,748,184 | A | * | 5/1998  | Shieh ....................... 345/173 |
| 5,764,222 | A | * | 6/1998  | Shieh ....................... 345/173 |
| 5,841,078 | A |   | 11/1998 | Miller |
| 5,845,122 | A |   | 12/1998 | Nielsen |
| 5,872,559 | A | * | 2/1999  | Shieh ....................... 345/157 |

(Continued)

OTHER PUBLICATIONS

Wu et al; Multi-Finger and Whole Hand Gesture Interaction Techniques for Multi-User Table Displays; p. 197.*

(Continued)

*Primary Examiner*—Ba Huynh
*Assistant Examiner*—Nicholas Augustine
(74) *Attorney, Agent, or Firm*—Workman Nydegger

(57) ABSTRACT

Input is provided to an application using a plurality of physical objects disposed adjacent to an interactive display surface. A primary location is determined where a primary physical object, e.g., a finger or thumb of the user, is positioned adjacent to the interactive display surface. An additional location is determined where an additional physical object is positioned adjacent to the interactive display surface. The attribute might be a size of an image or selected portion of the image that will be retained after cropping. A change in position of at least one of the objects is detected, and the attribute is adjusted based on the change in position of one or both objects. A range of selectable options of the application can also be display by touching the interactive display surface with one's fingers or other objects, and one of the options can be selected with another object.

47 Claims, 21 Drawing Sheets

U.S. PATENT DOCUMENTS

| | | | |
|---|---|---|---|
| 5,914,708 | A | 6/1999 | LaGrange |
| 5,920,313 | A | 7/1999 | Diedrichsen |
| 5,963,671 | A | 10/1999 | Comerford |
| 6,201,528 | B1 | 3/2001 | Lucas |
| 6,266,061 | B1* | 7/2001 | Doi et al. ................... 715/863 |
| 6,590,568 | B1 | 7/2003 | Astala |
| 6,598,978 | B2 | 7/2003 | Hasegawa |
| 6,603,463 | B1 | 8/2003 | Rising |
| 6,606,086 | B1 | 8/2003 | Sumner |
| 6,803,905 | B1 | 10/2004 | Capps |
| 6,910,132 | B1* | 6/2005 | Bhattacharya ............. 713/186 |
| 7,084,859 | B1* | 8/2006 | Pryor ........................ 345/173 |
| 7,126,609 | B1 | 10/2006 | Asente |
| 7,307,622 | B2* | 12/2007 | Uchiyama .................. 345/173 |
| 7,307,623 | B2* | 12/2007 | Enomoto .................... 345/173 |
| 7,554,530 | B2 | 6/2009 | Mizobuchi |
| 2001/0012001 | A1* | 8/2001 | Rekimoto et al. .......... 345/173 |
| 2002/0130839 | A1* | 9/2002 | Wallace et al. ............. 345/157 |
| 2003/0043189 | A1 | 3/2003 | Rieffel |
| 2004/0135818 | A1 | 7/2004 | Thomson |
| 2004/0168107 | A1 | 8/2004 | Sharp |
| 2005/0039145 | A1 | 2/2005 | Diering |
| 2005/0050024 | A1 | 3/2005 | Ellis |
| 2005/0086610 | A1 | 4/2005 | Mackinlay |
| 2005/0116929 | A1 | 6/2005 | Molander |
| 2005/0162402 | A1 | 7/2005 | Watanachote |
| 2006/0062094 | A1 | 3/2006 | Nathan |
| 2006/0097991 | A1 | 5/2006 | Hotelling |

OTHER PUBLICATIONS

"3.6 Interpolation in Two or More Dimensions." Numerical Recipes in C: The Art of Scientific Computing. Chapter 3. Interpolation and Extrapolation. © 1988-1992, Cambridge University Press. Numerical Recipes Software. pp. 123-128.

"Bar Code 1,2-Dimensional Bar Code Page." Available http://www.adams1.com/pub/russadam/stack.html. Printed Jan. 20, 2004. 14pp.

Ambiente article. "InteracTable®." Dated Jul. 7, 2000. Available http://www.darmstadt.gmd.de/ambiente/activities/interactable.html. Printed Nov. 21, 2003. 3pp.

Bier, Stone, Pier, Buston, and DeRose. "Toolglass and Magic Lenses: The See-Through Interface." *Proceedings of Siggraph '93* (Anaheim, August). *Computer Graphics Annual Conference Series*, ACM, 1993, pp. 73-80. 8pp.

Blickenstorfer, Conrad H. "First Look: Acer TravelMate TM100 with Windows XP Tablet PC Edition." Pen Computing Magazine. Jul. 2002. pp. 44-47.

"DiamondSpin—Begs for Direct Manipulation Technology Is it the Pen? Sony Leaps Out-of-the-Box Again with Gummi." Mitsubishi/DiamondSpin. CHI 2004 #3. Printed Apr. 30, 2004. 5pp.

Dietz and Leigh. "DiamondTouch: A Multi-User Touch Technology." *UIST '01* Orlando FLA. © ACM 2001 1-58113-438-x/01/11. CHI Letters 3 (2). Nov. 11-14, 2001. pp. 219-226.

Electronic Check Alliance Processing, Inc. "Gift Cards, How Stored Value Card Systems Work." Available. http://www.electron-cap.com/GiftCards.htm. Printed Jan. 20, 2004 and May 16, 2004. © 2003. 2pp. total (3pp printed).

Fukuchi and Rekimoto. "Interaction Techniques for SmartSkin." *ACM UIST2002 demonstration*, 2002. 2pp.

Grabowski, Robert. "A Miniature Video Laser Range Finder for Small Robots." Available http://www.andrew.cmu.edu/~rig/research/research_hardware/laser_rangefinder.html. Printed May 16, 2004. 8pp.

Grant and Winograd. "Flexible, Collaborative Organization on a Tabletop." *ACM CSCW 2002: Workshop on Co-located Tabletop Collaboration: Technologies and Directions*. New Orleans, LA. Nov. 2002. pp. 1-4.

Horn, Berthold K. P. "Robot Vision." The MIT Press. Available http://mitpress.mit.edu/catalog/item/default.asp?ttype=2&tid=8388. Printed Dec. 17, 2003. 6pp. total.

Horn, Berthold Klaus Paul. "Robot Vision." Binary Images: Topological Properties. The MIT Electrical Engineering and Computer Science Series. 1986. pp. 66-71 and cover page(s).

Hunter, Andrew. "Connected Components Analysis (Computer Vision)." www.google.com search results http://www.google.com/search?sourceid=navclient&q=connected+component+ellipse. Printed Mar. 7, 2004. Article dated Sep. 24, 2002. 2pp search results, 21pp article.

"IR Distance Sensor." Available http://www.diyelectronics.com/Accessories/IRDS.html (2pp) and http://www.diyelectronics.com/Accessories/GP2D05.html (1pg). Printed Dec. 30, 2003. 3pp.

Ishii and Ullmer. "Tangible Bits: Towards Seamless Interfaces between People, Bits and Atoms." *Proceedings of CHI '97*, Mar. 22-27, 1997, Atlanta, Georgia. © 1997 ACM 0-89791-802-9/97/03. pp. 1-8.

Ishii, Wisneski, Orbanes, Chun, and Paradiso. "PingPongPlus: Design of an Athletic-Tangible Interface for Computer-Supported Cooperative Play." *Proceeding of CHI '99*, May 15-20, 1999, © 1999 ACM. pp. 1-8.

Johanson, Kolodny, and Russell. "A Hand pose and Position Tracker for the Interactive Table." CS223B Final Project. Available http://graphics.stanford.edu/~drussel/vision/tracker-report.html. Printed Dec. 16, 2003, 6pp.

Ju, Hurwitz, Judd, and Lee. "CounterActive: An Interactive Cookbook for the Kitchen Counter." *Extended Abstracts of CHI 2001*, Seattle. Apr. 2001. pp. 269-270.

Kang, Sing Bing. "Radial Distortion Snakes." *IAPR Workshop on Machine Vision Applications (MVA2000)*, Tokyo, Japan. Nov. 2000. pp. 603-606.

Kato, Billinghurst, Poupyrev, Imamoto, and Tachibana. "Virtual Object Manipulation on a Table-Top AR Environment." *IEEE and ACM Int'l Symposium on Augmented Reality 2000, ISAR '2000*, Oct. 5-6, 2000, Munich. 9pp.

Klemmer, Newman, and Sapien. "The Designer's Outpost: A Task-Centered Tangible Interface for Web Site Information Design." *Proceedings of Human Factors in Computing Systems: CHI 2000 Extended Abstracts*. The Hague, The Netherlands. Apr. 1-6, 2000. pp. 333-334.

Klemmer, Newman, Farrell, Bilezikjian, and Landay. "The Designers' Outpost: A Tangible Interface for Collaborative Web Site Design." *CHI Letters, The 14th Annual ACM Symposium on User Interface Soft Technology: UIST 2001*. 3(2). pp. 1-10.

Kobayashi, Hirano, Narita, and Ishii. "A Tangible Interface for IP Network Simulation." *CHI 2003*, Apr. 5-10, 2003, Ft. Lauderdale, FL ACM 1-58113-630-7/03/0004. 2pp.

Koike, Sato, and Kobayashi. "Integrating Paper and Digital Information on EnhancedDesk: A Method for Realtime Finger Tracking on an Augmented Desk System." *ACM Transaction on Computer-Human Interaction*, vol. 8 No. 4, Dec. 2001. © 2001 ACM 1073-0516/01/1200-0307. pp. 307-322.

Leibe, Starner, Ribarsky, Wartell, Krum, Singletary, and Hodges. "The Perceptive workbench: Toward Spontaneous and Natural Interaction in Semi-Immersive Virtual Environments." *Proceedings of the IEEE Virtual Reality 2000 Conference*, Mar. 18-22, 2000. New Brunswick, New Jersey: IEEE Computer Society, 2000. 8pp.

Leigh and Dietz. "DiamondTouch Characteristics and Capabilities." Mitsubishi Electric Research Laboratories, Cambridge, Massachusetts, USA. Undated. 2pp.

Magerkurth, Stenzel, and Prante. "STARS—A Ubiquitous Computing Platform for Computer Augmented Tabletop Games." *5th International Conference on Ubiquitous Computing (Ubicomp '03)*, Oct. 12-15, 2003, Seattle, Washington. 2pp.

Malandain, Grégoire. "Connected Components Extraction." Available http://www-sop.inria.fr/epidaure/personnel/malandain/segment/connexe.html. Printed Dec. 18, 2003. 3pp.

Matsushita and Rekimoto. "HoloWall: Designing a Finger, Hand, Body, and Object Sensitive Wall." *UIST '97* Banff, Alberta, Canada. © 1997 ACM 0-89791-881-9/97/10. pp. 209-210.

Missouri Department Of Revenue. "2D Barcode Technology." Undated. 3pp.

Moran, Saund, van Melle, Gujar, Fishkin, and Harrison. "Design and Technology for Collaborage; Collaborative Collages of Information on Physical Walls." *UIST '99*. Asheville, NC. © 1999 ACM 1-58113-075-9/99/11, CHI Letters vol. 1, 1. pp. 197-206.

Pangaro, Maynes-Aminzade, and Ishii. "The Actuated Workbench: Computer-Controlled Actuation in Tabletop Tangible Interfaces." *Proceedings of UIST 2002*, Oct. 27-30, 2002. © 2002 ACM. 10pp.

Paradiso, Hsiao, Strickon, Lifton, and Adler. "Sensor systems for interactive surfaces." *IBM Systems Journal*, vol. 39, Nos. 3&4, 2000. pp. 892-914.

Patten, Ishii, Hines, and Pangaro. "Sensetable: A Wireless Object Tracking Platform for Tangible User Interfaces." *Proceedings of CHI 2001*, Mar. 31-Apr. 5, 2001, ACM Press, © 2001 ACM. 8pp.

Patten, Recht, and Ishii. "Audiopad: A Tag-based Interface for Musical Performance." *Proceedings of Corference on New Interface for Musical Expression (NIME '02)*. Dublin, Ireland, May 24-26, 2002. 6pp.

Ramos and Balakrishnan. "Fluid Interaction Techniques for the Control and Annotation of Digital Video." *UIST '03* Vancouver, B.C., Canada. © 2003 ACM 1-58113-636-06/03/0010. pp. 105-114.

Rekimoto and Ayatsuka. "CyberCode: Designing Augmented Reality Environments with Visual Tags." *Proc. of UIST 2000*, 2000. 10pp.

Rekimoto and Matsushita "Perceptual Surfaces: Towards a Human and Object Sensitive Interactive Display." *Proceedings of Workshop on Perceptural User Interactes (PUI'97)*, 1997. 3pp.

Rekimoto and Nagao. "The World through the Computer: Computer Augmented Interaction with Real World Environments." *Proceedings of UIST'95*, 1995. pp. 29-36.

Rekimoto and Saitoh. "Augmented Surfaces: A Spatially Continuous Work Space for Hybrid Computing Environments." *CHI '99*, May 15-20, 1999. Pittsburgh, Pennsylvania. © ACM 1999 0-201-48559-1/99/05. pp. 378-385.

Rekimoto, Jun. "Matrix: A Realtime Object Identification and Registration Method for Augmented Reality." *Proc. of Asia Pacific Computer Human Interaction (APCHI '98)*, 1998. 6pp.

Rekimoto, Jun. "Multiple-Computer User Interfaces: 'Beyond the Desktop' Direct Manipulation Environments." *ACI CHI2000 Video Proceedings*, 2000. 2pp.

Rekimoto, Jun. "Pick-and-Drop: A Direct Manipulation Technique for Multiple Computer Environments." *Proceedings of UIST'97*, 1997. pp. 31-39.

Rekimoto, Jun. "SmartSkin: An Infrastructure for Freehand Manipulation on Interactive Surfaces." *CHI 2002*, Apr. 20-25, 2002, Minneapolis, Minnesota. © 2001 ACM 1-58113-453-3/02/0004. 8pp.

Rekimoto, Ullmer, and Oba "DataTiles: A Modular Platform for Mixed Physical and Graphical Interactions." *SIGCHI'01*, Mar. 31-Apr. 4, 2001, Seattle, WA. © 2001 ACM 1-58113-327-8/01/0003. 8pp.

Reznik, Canny, and Alldrin. "Leaving on a Plane Jet." *2001 Int. Conf. on Intell. Robots & Systems (IROS)*, Maui, Hawaii, Oct. 2001. 6pp.

Ringel, Gerh, Jin, and Winograd. "Barehands: Implement-Free Interaction with a Wall-Mounted Display." Short Talks. *CHI 2001* Mar. 31-Apr. 5. pp. 367-368.

Rosenfeld, Zawadzki, Sudol, and Perlin. "Planar Manipulator Display." New York University mrl. NYU Media Research Lab. Available http://cat.nyu.edu/PMD. Printeid May 16, 2004. 3pp.

Rovani, David (Posted by). "My Second Month with the Compaq Tablet." *Home>Reviews*, TablePCHome.com—*Table PC user community*. Posted Apr. 10, 2003. Available http://www.tabletpchome.com/Messages.aspx?ThreadID=140. Printed Dec. 30, 2003. pp. 1-2 of 5.

Schmalstieg, Encarmação, and Szalavári. "Using Transparent Props for Interaction With the Virtual Table." Presented at *1999 ACM Symposium on Interactive 3D Graphics (I3DG '99)*. Apr. 26-28, 1999, Atlanta, GA. 7pp.

Scott, Grant, and Mandryk. "System Guidelines for Co-located collaborative Work on a Tabletop Display." *Proceedings of ECSCW'03, European Conference Computer-Supported Cooperative Work 2003*, Helsinki, Finland, Sep. 14-18, 2003. 20pp.

Shen, Everitt, and Ryall. "UbiTable: Impromptu Face-to-Face Collaboration on Horizontal Interactive Surfaces." © Mitsubishi Electric Research Laboratories, Inc., 2003. Cambridge, Massachusetts. TR-2003-49. Sep. 2003. 10pp.

Shen, Lesh, and Vernier. "Personal Digital Historian: Story Sharing Around the Table." *Interactions*. Mar. + Apr. 2003. pp. 15-22.

Shen, Lesh, Bernier, Forlines, and Frost. "Sharing and Building Digital Group Histories." *CSCW'02*, Nov. 16-20, 2002, New Orleans, Louisiana. © 2002 ACM 1-58113-560-2/02/0011. 10pp.

Shen, Lesh, Moghaddam, Beardsley, and Bartley. "Personal Digital Historian: User Interface Design." © Mitsubishi Electric Research Laboratories, Inc. 2001. Cambridge, Massachusetts. 5pp.

Shen, Vernier, Forline, and Ringel. "DiamondSpin: An Extensible Toolkit for Around-the-Table Interaction." *CHI 2004*, Apr. 24-29, 2004, Vienna, Austria. © 2004 ACM 1-58113-702-8/04/0004. 8pp.

Smart Technologies Inc. White Paper. "DViT Digital Vision Touch Technology." Feb. 2003. 10pp.

Smart Technologies, Inc. "Rear Projection SMART Board™ Interactive Whiteboard" "SMART Board Software". Available http://www.smarttech.com/Products/rearprojection/index.asp and http://www.smarttech.com/Products/sbsoftware/index.asp. Printed Dec. 16, 2003. 5pp. total.

Stamer, Leibe, Singletary, Lyons, Gandy, and Pair. "Towards Augmented Reality Gaming." Available http://www.gvu.gatech.edu/ccg/publications/imagina2000/. Printed Dec. 30, 2003. 27pp.

Streitz, Geißler, Holmer, Konomi, Müller-Tomfelde, Reischl, Rexrogh, Seitz, and Steinmetz. "i-LAND: An interactive Landscape for Creativity and Innovation." *Proceedings of the ACM Conference on Human Factors in Computing Systems (CHI'99)*, Pittsburgh, Pennsylvania, May 15-20, 1999. ACM Press, New York. pp. 120-127.

Symanzik, Jürgen. "Three-Dimensional Statistical Graphics Based on Interactively Animated Anaglyphs." Published 1993. Available http://citeseer.mj.nec.com/95667.html. Printed Feb. 25, 2004. 7pp. total.

"The Tablet PC A detailed look at Microsoft's proposed Tablet PC." *Pen Computing Magazine: Tablet PC*. Available http://www.pencomputing.com/frames/textblock_tablet_pc.html. Printed Dec. 30, 2003. pp. 1.

Tandler, Prante, Müller-Tornfelde, Streitz, and Steinmetz. "ConnecTables: Dynamic Coupling of Displays for the Flexible Creation of Shared Workspaces." *Proceedings of the 14. Annual ACM Symposium on User Interface Software and Technoic (USIT'01)*, ACM Press (CHI Letters 3 (2)), 2001, pp. 11-20 (10pp).

Ullmer and Ishii. "The metaDESK: Models and Prototypes for Tangible User Interfaces." *Proceedings of UIST'97*, Oct. 14-17, 1997. © 1997 ACM—ACM 0-89791-881-9/97/10. 10pp.

Ullmer, Ishii, and Glas. "mediaBlocks: Physical Containers, Transports, and Controls for Online Media." *Computer Graphics Proceedings (SIGGRAPH'98)*, Jul. 19-24, 1998, © 1998 ACM. ACM-0-89791-999-8-8/98/007. 8pp.

Ullmer, Ishii, and Jacob. "Tangible query Interfaces: Physically Constrained Tokens for Manipulating Database Queries." *Proc. INTERACT 2003 Conference*, 2003. 11pp.

Underkoffler and Ishii. "Illuminating Light: An Optical Design Tool with a Luminous-Tangible Interface." *Proceeding of CHI '98*, Apr. 18-23, 1998, © 1998 ACM. pp. 1-8.

Underkoffler and Ishii. "Urp: A Luminous-Tangible Workbench for Urban Planning and Design." *Proceedings of CHI '99*. May 15-20, 1999. © 1998 ACM. pp. 1-8.

Underkoffler, Ullmer, and Ishii. "Emancipated Pixels: Real-World Graphics in the Luminous Room." *Proceedings of SIGGRAPH '99*, Aug. 8-13, 1999, © 1999 ACM. 8pp.

Vernier, Lesh, and Shen. "Visualization Techniques for Circular Tabletop Interfaces." To appear in *Advanced Visual Interfaces*, May 2002, Trento, Italy. © 2002 Mitsubishi Electric Research Laboratories, Inc. MERL-TR2002-01. Authored Mar. 2002. 10pp.

Viola and Jones. "Robust Real-time Object Detection." Cambridge Research Laboratory, Technical Report Series. Compaq. CRL 2001/01, Feb. 2001. 30pp.

"VIRTUALBOARD." Available http://visilab.unime.it/visilab/virtualboard.htm. Printed Dec. 16, 2003. 6pp.

Von Hardenberg and Bérard. Bare-Hand Human-Computer Interaction. *PUI 2001* Orlando, FL, © 2001 ACM 1-58113-448-7-11/14/01. 8pp.

Wellner, Pierre. "Interacting with Paper on the DigitalDesk." *Communications of the ACM*. Jul. 1993. EuroPARC tech report EPC-93-195. 17pp.

Whalen, Tara. "Playing well with Others: Applying Board Game Design to Tabletop Display Interfaces." *UIST 2003*. Vancouver, Nov. 2-5, 2003, 3pp.

Wu and Balakrishnan. "Multi-Finger and Whole Hand Gestural Interaction Techniques for Multi-User Tabletop Displays." *UIST '03*, Vancouver, B.C., Canada. © 2003 ACM 1-58113-636-6/03/0010. pp. 193-202.

Gerd Waloszek "Interaction Design Guide for Touchscreen Applications" Jan. 22, 2003.

Microsoft "Final Release of Windows Media 9 Series Starts Next Wave of Digital Media", Jan. 7, 2003.

Kenton O'Hara, Matthew Lipson, Marcel Jansen, Axel Unger, Huw Jeffries, Peter Macer "Jukola: Democratic Music Choice in a Public Space", DIS2004, Aug. 1-4, 2004 pp. 145-154.

Touch-N-Go Software, www.touch-n-go.com/software.htm Wayback Machine for Oct. 19, 2004.

Office Action dated Aug. 22, 2007 cited in U.S. Appl. No. 10/879,872.

Office Action dated Apr. 10, 2008 cited in U.S. Appl. No. 10/879,872.

Notice of Allowance dated Dec. 31, 2008 cited in U.S. Appl. No. 10/879,872.

Office Action dated Aug. 1, 2008 cited in U.S. Appl. No. 10/991,813.

Office Action dated Feb. 23, 2009 cited in U.S. Appl. No. 10/991,813.

Office Action dated Aug. 19, 2009 cited in U.S. Appl. No. 10/991,813.

* cited by examiner

USING PHYSICAL OBJECTS TO ADJUST ATTRIBUTES OF AN INTERACTIVE DISPLAY APPLICATION

FIELD OF THE INVENTION

The present invention generally pertains to a computing system having an interactive display surface operable to detect physical objects placed adjacent to the interactive display surface, and more specifically, to detect positions and movements of the physical objects to provide input to change one or more attributes of an application being executed by the computing system.

BACKGROUND OF THE INVENTION

Personal computers (PCs) have become increasingly more powerful in many different respects. One example of the increased power of computers is in their tremendously improved graphics capabilities. While early PCs were limited to four colors and pixilated low resolution displays, contemporary computers provide colorful, high-resolution graphics that are more than suitable for viewing digital photographs or watching movies as well as enabling display of fast moving virtual images in games and other applications.

The improved power of computers also has resulted in today's computers being far more user friendly than their predecessors. Not long ago, personal computers were command-driven, requiring users to remember and enter combinations of keystrokes to direct a computer to perform even simple commands. Today, users engage computers using pointing devices, handwriting recognition, speech recognition, and other simple, intuitive techniques. Personal computers appear on nearly every desk in the workplace. Many households now have multiple computers, and even in-home local area networks.

As computers become more powerful and more ubiquitous throughout our environment, the desire to make computers and their interfaces even more user friendly continues to promote development in this area. For example, the MIT Media Lab, as reported by Brygg Ullmer and Hiroshi Ishii in "The metaDESK: Models and Prototypes for Tangible User Interfaces," Proceedings of UIST 10/1997:14-17," has developed another form of "keyboardless" human-machine interface. The metaDESK includes a generally planar graphical surface that not only displays computing system text and graphic output, but also receives user input by responding to an object placed against the graphical surface. The combined object-responsive and display capability of the graphical surface of the metaDESK is facilitated using infrared (IR) light, an IR camera, a video camera, a video projector, and mirrors disposed beneath the surface of the metaDESK. The mirrors reflect the graphical image projected by the projector onto the underside of the graphical display surface to provide images that are visible to a user from above the graphical display surface. The IR camera can detect IR light reflected from the undersurface of an object placed on the graphical surface.

Others have been developing similar keyboardless interfaces. For example, papers published by Jun Rekimoto of the Sony Computer Science Laboratory, Inc., and associates describe a "HoloWall" and a "HoloTable" that display images on a surface and use IR light to detect objects positioned adjacent to the surface.

By detecting a specially formed object or IR-reflected light from an object disposed on a graphical display surface, the metaDESK can respond to the contemporaneous placement and movement of the object on the display surface to carryout a predefined function, such as displaying and moving a map of the MIT campus. Such systems are generally limited to responding to a specific object in a predefined manner.

It would be desirable to expand upon the functionality of an interactive display system, to enable a user to interact with a display surface more intuitively, naturally, and completely. Ideally, a user should be able to engage a computer system, such as by responding to prompts, issuing commands, or changing attributes, without having to use a keyboard or make use of any specific physical objects. To make the use of a personal computer even more convenient, it would clearly be desirable to interact with images or other graphical information presented by a computing system on a display screen by using ordinary objects or even one's own hands and fingers.

SUMMARY OF THE INVENTION

One of the advantages of the present invention is that it provides a convenient, natural, and intuitive manner for a user to interact with a computer system having an interactive display surface. In conventional systems, a user responds to images or other attributes of applications presented on a display by engaging a keyboard, a pointing device, or another input device that is separate and removed from the display. In contrast, the present invention enables a user to employ physical objects, such as fingers and thumbs of the user's hand, to modify images presented on the interactive display surface. Similarly, a user can use digits on the user's hands or other physical objects to modify attributes of an application executing on the computer system associated with the interactive display surface. Thus, a user can provide input to the computer system by interacting directly with the output of the computer system to provide the input. While the present invention is particularly useful in resizing or cropping images that are rectangular, it should be understood that the user's fingers or hands or other physical objects can be applied in resizing or cropping virtual entities other than rectangular images. For example, the user can interact with irregularly-shaped virtually entities or with three-dimensional entities to resize or crop them, just as discussed below in regard to resizing or cropping images.

It will be helpful to illustrate how this invention is employed in controlling attributes in a software application that is executed on a computer system associated with the interactive display surface. This application includes at least one attribute that can be changed during execution of the application. A primary location is determined where a primary physical object is positioned adjacent to the interactive display surface. An additional location is determined where an additional physical object is positioned adjacent to the interactive display surface. The attribute is associated with the primary location and the additional location. A change in position of at least one of the primary location and the additional location is determined, and the attribute is adjusted based on the change in position of at least one of the primary location and the additional location. The attributes of the application can thus be adjusted, for example, by touching the interactive display surface with one's fingers or other objects.

In accord with one embodiment of the present invention, the primary location, the additional location, and changes in the locations are determined using IR light. IR light is transmitted through the interactive display surface toward a face of the interactive display surface. The primary physical object and the secondary physical object are disposed adjacent to an opposite side of the interactive display surface. The primary and additional locations thus are determined by sensing IR light reflected from the primary physical object when the primary and additional physical objects, respectively, are positioned adjacent to the interactive display surface. Changes in the position of the primary and additional locations are determined by sensing changes in the locations of the primary physical object and the secondary physical object, respectively. In one embodiment of the present invention, at least one of the primary physical object and the additional physical object is a digit on one of a user's hands.

In one embodiment of the present invention, the attribute includes a size of an image displayed on the interactive display surface. The size of the image displayed is changed first by determining that either the primary location or the secondary location is either disposed on a boundary of the image or within the image and that the primary and additional locations are either generally vertically aligned or horizontally aligned with each other. The image is resized by moving at least its opposite boundaries as defined by the primary location and the additional location. An aspect ratio of the image may be either preserved or changed relative to changes of the boundaries of the image.

The invention also enables the portion of the image that is displayed to be readily changed, i.e., by cropping the image, in response to objects that are positioned on the interactive display surface. Cropping the image displayed begins with determining that the primary location and the additional location are neither in vertical nor horizontal alignment with each other. A new image boundary is then determined based upon the positions of the primary location and the additional location, so that its diagonally opposite corners correspond to the positions of the primary location and the additional location, and all but the portion of the image bounded by the new image boundary is deleted from the display surface.

Further, the present invention can be employed for changing an attribute relating to a property selected from a property selection range displayed adjacent to the primary location. The property selection range, such as a menu, includes a range of property choices arrayed across positions encompassed by the property selection range. The additional location is associated with a property selected from the range of property choices that is closest to the additional location. The attribute is then adjusted in accordance with the property selected.

The size of the property selection range may be selectively adjusted by the user. The size is changed by detecting a secondary location adjacent to the interactive display surface where a second physical object is placed. The size of the property selection range is then adjusted to generally fit the space defined by the primary location and the secondary location. For example, if the user uses a thumb and a finger of one of the user's hands as the first and second physical objects, the property selection range may be fit to the space defined by the user's thumb and finger. The user might then make a selection from the property selection range so defined by using a finger from the user's other hand.

It will be appreciated that a property selection range may also be used to invoke subsidiary property selection ranges or sub-menus. Again, the property selection range can include a range of property choices arrayed across positions encompassed by the property selection range. The additional location is associated with a property selected among the range of property choices. An additional property selection range associated with the selected property is presented, providing an additional array of choices. An additional property selected is determined by associating an additional property choice closest to a changed additional location of the additional physical object. The corresponding attribute is then adjusted in accordance with the selection.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Exemplary Computing System for Implementing Present Invention

Figure 1:
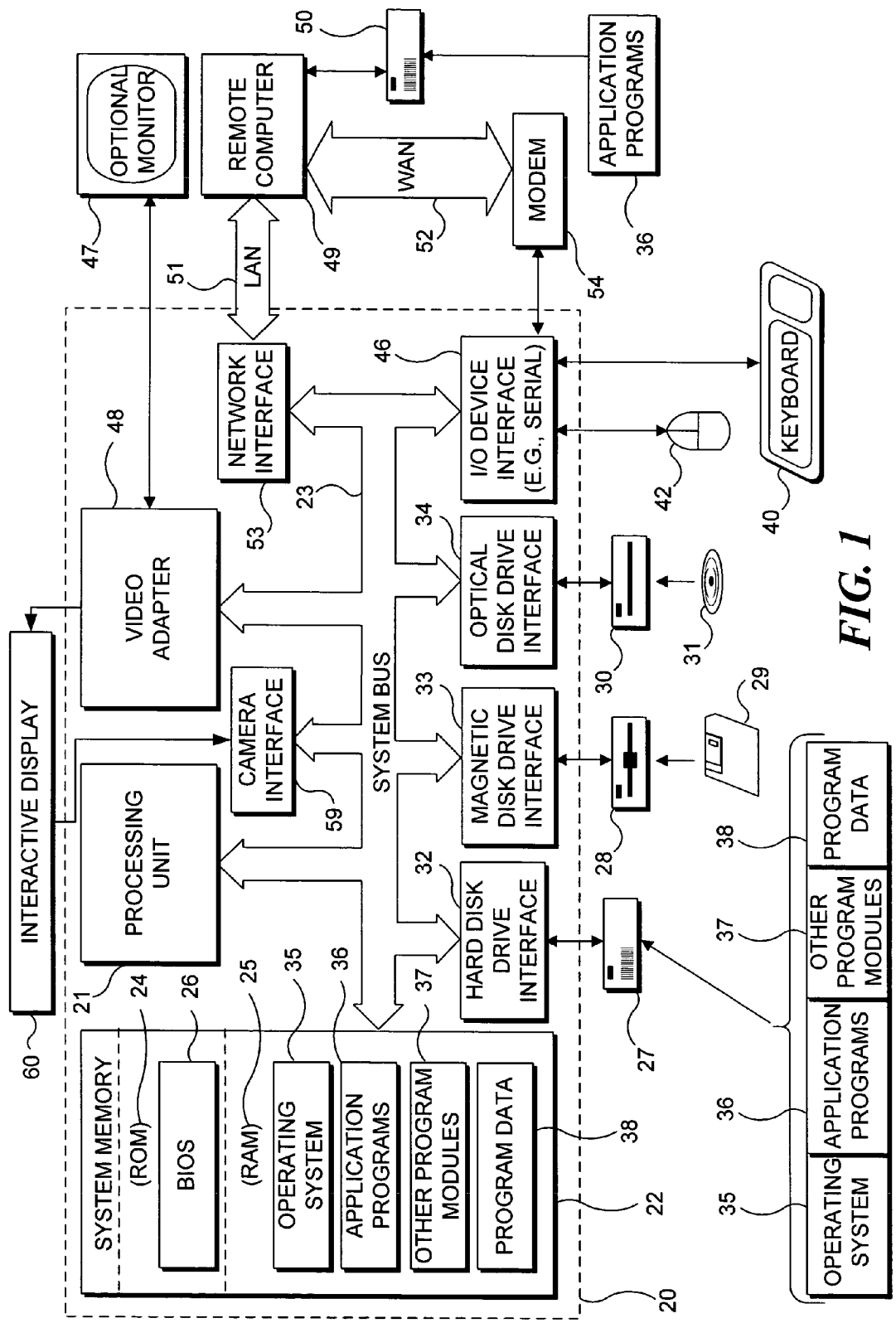
FIG. 1 is a functional block diagram of a generally conventional computing device or personal computer (PC) that is suitable for use with an interactive display surface in practicing the present invention.

With reference to FIG. 1, an exemplary system suitable for implementing various portions of the present invention is shown. The system includes a general purpose computing device in the form of a conventional PC 20, provided with a processing unit 21, a system memory 22, and a system bus 23. The system bus couples various system components including the system memory to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the PC 20, such as during start up, is stored in ROM 24. PC 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a compact disk-read only memory (CD-ROM) or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for PC 20. Although the exemplary environment described herein employs a hard disk, removable magnetic disk 29, and removable optical disk 31, it will be appreciated by those skilled in the art that other types of computer readable media, which can store data and machine instructions that are accessible by a computer, such as magnetic cassettes, flash memory cards, digital video disks (DVDs), Bernoulli cartridges, RAMs, ROMs, and the like, may also be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information in PC 20 and provide control input through input devices, such as a keyboard 40 and a pointing device 42. Pointing device 42 may include a mouse, stylus, wireless remote control, or other pointer, but in connection with the present invention, such conventional pointing devices may be omitted, since the user can employ the interactive display for input and control. As used hereinafter, the term "mouse" is intended to encompass virtually any pointing device that is useful for controlling the position of a cursor on the screen. Other input devices (not shown) may include a microphone, joystick, haptic joystick, yoke, foot pedals, game pad, satellite dish, scanner, or the like. These and other input/output (I/O) devices are often connected to processing unit 21 through an I/O interface 46 that is coupled to the system bus 23. The term I/O interface is intended to encompass each interface specifically used for a serial port, a parallel port, a game port, a keyboard port, and/or a universal serial bus (USB). System bus 23 is also connected to a camera interface 59, which is coupled to an interactive display 60 to receive signals from a digital video camera that is included therein, as discussed below. The digital video camera may be instead coupled to an appropriate serial I/O port, such as to a USB version 2.0 port. Optionally, a monitor 47 can be connected to system bus 23 via an appropriate interface, such as a video adapter 48; however, the interactive display table of the present invention can provide a much richer display and interact with the user for input of information and control of software applications and is therefore preferably coupled to the video adaptor. It will be appreciated that PCs are often coupled to other peripheral output devices (not shown), such as speakers (through a sound card or other audio interface—not shown) and printers.

The present invention may be practiced using a single computing device, although PC 20 can also operate in a networked environment using logical connections to one or more remote computers, such as a remote computer 49. Remote computer 49 may be another PC, a server (which is typically generally configured much like PC 20), a router, a network PC, a peer device, or a satellite or other common network node, and typically includes many or all of the elements described above in connection with PC 20, although only an external memory storage device 50 has been illustrated in FIG. 1. The logical connections depicted in FIG. 1 include a local area network (LAN) 51 and a wide area network (WAN) 52. Such networking environments are common in offices, enterprise wide computer networks, intranets, and the Internet.

When used in a LAN networking environment, PC 20 is connected to LAN 51 through a network interface or adapter 53. When used in a WAN networking environment, PC 20 typically includes a modem 54, or other means such as a cable modem, Digital Subscriber Line (DSL) interface, or an Integrated Service Digital Network (ISDN) interface for establishing communications over WAN 52, e.g., over the Internet. Modem 54, which may be internal or external, is connected to the system bus 23 or coupled to the bus via I/O device interface 46, i.e., through a serial port. In a networked environment, program modules, or portions thereof, used by PC 20 may be stored in the remote memory storage device. It will be appreciated that the network connections shown are exemplary, and other means of establishing a communications link between the computers may be used, such as wireless communication and wide band network links.

Exemplary Interactive Surface

Figure 2:
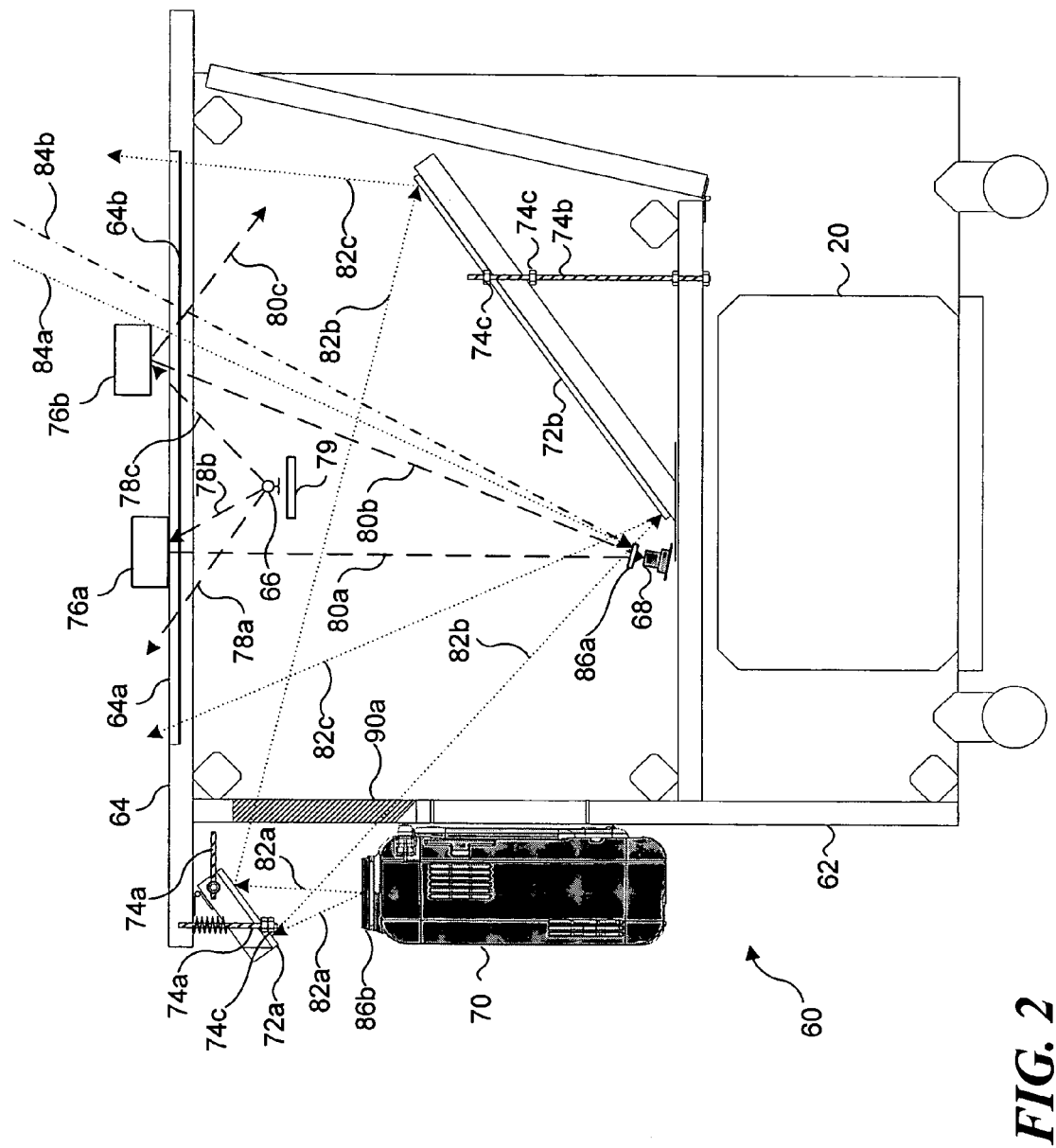
FIG. 2 is a cross-sectional view illustrating internal components of an interactive display surface in the form of an interactive table that includes an integral PC.

In FIG. 2, an exemplary interactive display table 60 is shown that includes PC 20 within a frame 62 and which serves as both an optical input and video display device for the computer. In this cut-away Figure of the interactive display table, rays of light used for displaying text and graphic images are generally illustrated using dotted lines, while rays of infrared (IR) light used for sensing objects on or just above a display surface 64a of the interactive display table are illustrated using dash lines. Display surface 64a is set within an upper surface 64 of the interactive display table. The perimeter of the table surface is useful for supporting a user's arms or other objects, including objects that may be used to interact with the graphic images or virtual environment being displayed on display surface 64a.

IR light sources 66 preferably comprise a plurality of IR light emitting diodes (LEDs) and are mounted on the interior side of frame 62. The IR light that is produced by IR light sources 66 is directed upwardly toward the underside of display surface 64a, as indicated by dash lines 78a, 78b, and 78c. The IR light from IR light sources 66 is reflected from any objects that are atop or proximate to the display surface after passing through a translucent layer 64b of the table, comprising a sheet of vellum or other suitable translucent material with light diffusing properties. Although only one IR source 66 is shown, it will be appreciated that a plurality of such IR sources may be mounted at spaced-apart locations around the interior sides of frame 62 to prove an even illumination of display surface 64a. The infrared light produced by the IR sources may:

exit through the table surface without illuminating any objects, as indicated by dash line 78a;

illuminate objects on the table surface, as indicated by dash line 78b; or illuminate objects a short distance above the table surface but not touching the table surface, as indicated by dash line 78c.

Objects above display surface 64a include a "touch" object 76a that rests atop the display surface and a "hover" object 76b that is close to but not in actual contact with the display surface. As a result of using translucent layer 64b under the display surface to diffuse the IR light passing through the display surface, as an object approaches the top of display surface 64a, the amount of IR light that is reflected by the object increases to a maximum level that is achieved when the object is actually in contact with the display surface.

A digital video camera 68 is mounted to frame 62 below display surface 64a in a position appropriate to receive IR light that is reflected from any touch object or hover object disposed above display surface 64a. Digital video camera 68 is equipped with an IR pass filter 86a that transmits only IR light and blocks ambient visible light traveling through display surface 64a along dotted line 84a. A baffle 79 is disposed between IR source 66 and the digital video camera to prevent IR light that is directly emitted from the IR source from entering the digital video camera, since it is preferable that this digital video camera should produce an output signal that is only responsive to the IR light reflected from objects that are a short distance above or in contact with display surface 64a and corresponds to an image of IR light reflected from objects on or above the display surface. It will be apparent that digital video camera 68 will also respond to any IR light included in the ambient light that passes through display surface 64a from above and into the interior of the interactive display (e.g., ambient IR light that also travels along the path indicated by dotted line 84a).

IR light reflected from objects on or above the table surface may be:
  reflected back through translucent layer 64b, through IR pass filter 86a and into the lens of digital video camera 68, as indicated by dash lines 80a and 80b; or
  reflected or absorbed by other interior surfaces within the interactive display without entering the lens of digital video camera 68, as indicated by dash line 80c.

Translucent layer 64b diffuses both incident and reflected IR light. Thus, as explained above, "hover" objects that are closer to display surface 64a will reflect more IR light back to digital video camera 68 than objects of the same reflectivity that are farther away from the display surface. Digital video camera 68 senses the IR light reflected from "touch" and "hover" objects within its imaging field and produces a digital signal corresponding to images of the reflected IR light that is input to PC 20 for processing to determine a location of each such object, and optionally, the size, orientation, and shape of the object. It should be noted that a portion of an object (such as a user's forearm) may be above the table while another portion (such as the user's finger) is in contact with the display surface. In addition, an object may include an IR light reflective pattern or coded identifier (e.g., a bar code) on its bottom surface that is specific to that object or to a class of related objects of which that object is a member. Accordingly, the imaging signal from digital video camera 68 can also be used for detecting each such specific object, as well as determining its orientation, based on the IR light reflected from its reflective pattern, in accord with the present invention. The logical steps implemented to carry out this function are explained below.

Figure 3:
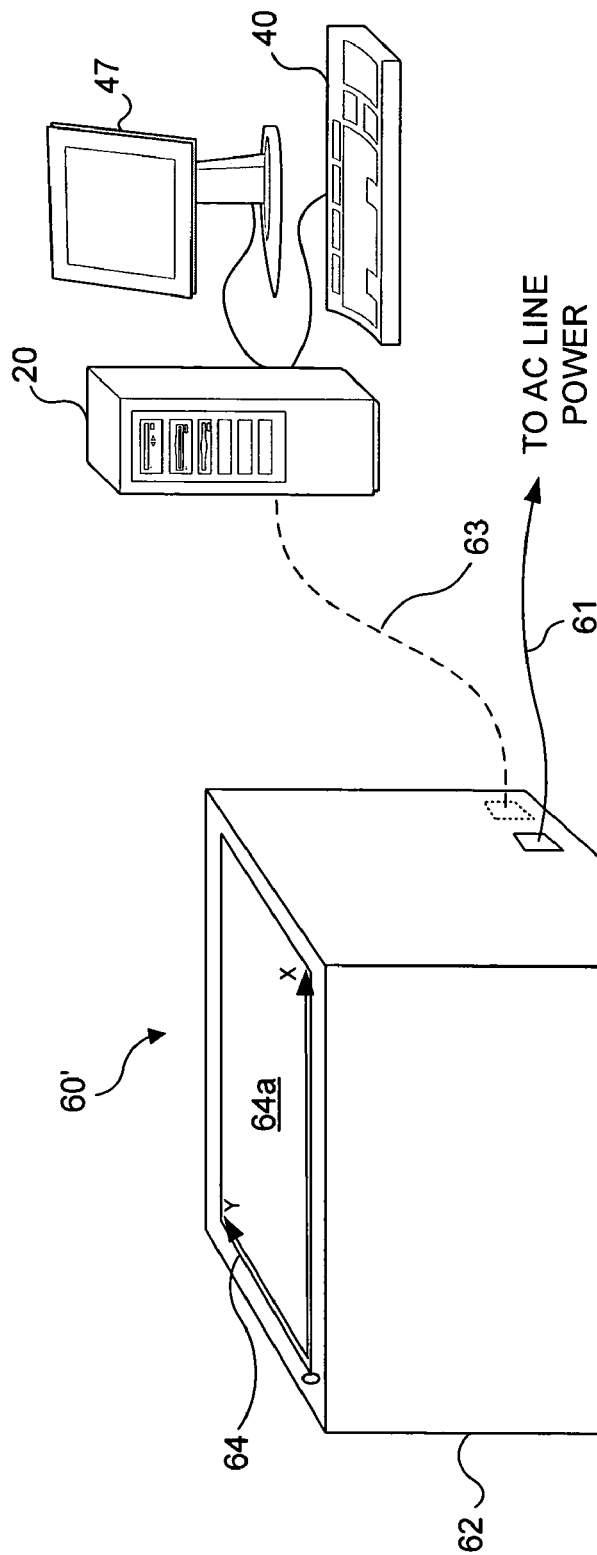
FIG. 3 is an isometric view of an embodiment in which the interactive table is connected to an external PC.

PC 20 may be integral to interactive display table 60 as shown in FIG. 2, or alternatively, may instead be external to the interactive display table, as shown in the embodiment of FIG. 3. In FIG. 3, an interactive display table 60' is connected through a data cable 63 to an external PC 20 (which includes optional monitor 47, as mentioned above). As also shown in this Figure, a set of orthogonal X and Y axes are associated with display surface 64a, as well as an origin indicated by "0." While not specifically shown, it will be appreciated that a plurality of coordinate locations along each orthogonal axis can be employed to indicate any location on display surface 64a.

If the interactive display table is connected to an external PC 20 (as in FIG. 3) or to some other type of external computing device, such as a set top box, video game, laptop computer, or media computer (none shown), then the interactive display table comprises an input/output device. Power for the interactive display table is provided through a power lead 61, which is coupled to a conventional alternating current (AC) line source (not shown). Data cable 63, which connects to interactive display table 60', can be coupled to a USB 2.0 port, an Institute of Electrical and Electronics Engineers (IEEE) 1394 (or Firewire) port, or an Ethernet port on PC 20. It is also contemplated that as the speed of wireless connections continues to improve, the interactive display table might also be connected to a computing device such as PC 20 via such a high speed wireless connection, or via some other appropriate wired or wireless data communication link. Whether included internally as an integral part of the interactive display, or externally, PC 20 executes algorithms for processing the digital images from digital video camera 68 and executes software applications that are designed to use the more intuitive user interface functionality of interactive display table 60 to good advantage, as well as executing other software applications that are not specifically designed to make use of such functionality, but can still make good use of the input and output capability of the interactive display table. As yet a further alternative, the interactive display can be coupled to an external computing device, but include an internal computing device for doing image processing and other tasks that would then not be done by the external PC.

An important and powerful feature of the interactive display table (i.e., of either embodiments discussed above) is its ability to display graphic images or a virtual environment for games or other software applications and to enable an interaction between the graphic image or virtual environment visible on display surface 64a and objects that are resting atop the display surface, such as an object 76a, or are hovering just above it, such as an object 76b. It is the ability of the interactive display table to visually detect such objects, as well as the user's finger or other object being moved by the user that greatly facilities this rich interaction.

Again referring to FIG. 2, interactive display table 60 includes a video projector 70 that is used to display graphic images, a virtual environment, or text information on display surface 64a. The video projector is preferably of a liquid crystal display (LCD) or digital light processor (DLP) type, or a liquid crystal on silicon (LCoS) display type, with a resolution of at least 640×480 pixels. An IR cut filter 86b is mounted in front of the projector lens of video projector 70 to prevent IR light emitted by the video projector from entering the interior of the interactive display table where the IR light might interfere with the IR light reflected from object(s) on or above display surface 64a. A first mirror assembly 72a directs projected light traveling from the projector lens along dotted path 82a through a transparent opening 90a in frame 62, so that the projected light is incident on a second mirror assembly 72b. Second mirror assembly 72b reflects the projected light along a path 82b onto translucent layer 64b, which is at the focal point of the projector lens, so that the projected image is visible and in focus on display surface 64a for viewing.

Alignment devices 74a and 74b are provided and include threaded rods and rotatable adjustment nuts 74c for adjusting the angles of the first and second mirror assemblies to ensure that the image projected onto the display surface is aligned with the display surface. In addition to directing the projected image in a desired direction, the use of these two mirror assemblies provides a longer path between projector 70 and translucent layer 64b, and more importantly, helps in achieving a desired size and shape of the interactive display table, so that the interactive display table is not too large and is sized and shaped so as to enable the user to sit comfortably next to it.

The foregoing and following discussion describes an interactive display device in the form of interactive display table 60 and 60'. Nevertheless, it should be understood that the interactive display surface need not be in the form of a generally horizontal table top. The principles described in this description of the invention suitably also include and apply to display surfaces of different shapes and curvature that are mounted in orientations other than horizontal. Thus, although the following description refers to placing physical objects "on" the interactive display surface, it will be understood that the word "on" in this context means that the physical objects may be placed adjacent or near to the interactive display surface, as well as in contact with the interactive display surface.

Using Physical Objects to Manipulate a Displayed Entity

Figure 4A:
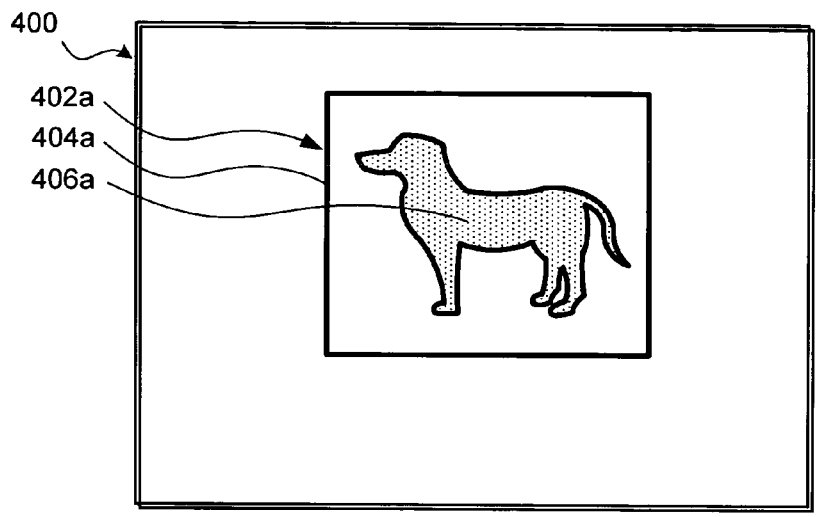
FIGS. 4A-4I illustrate an image being resized on the interactive display surface by a user's fingers, while preserving the aspect ratio of the image.
Figure 4B:
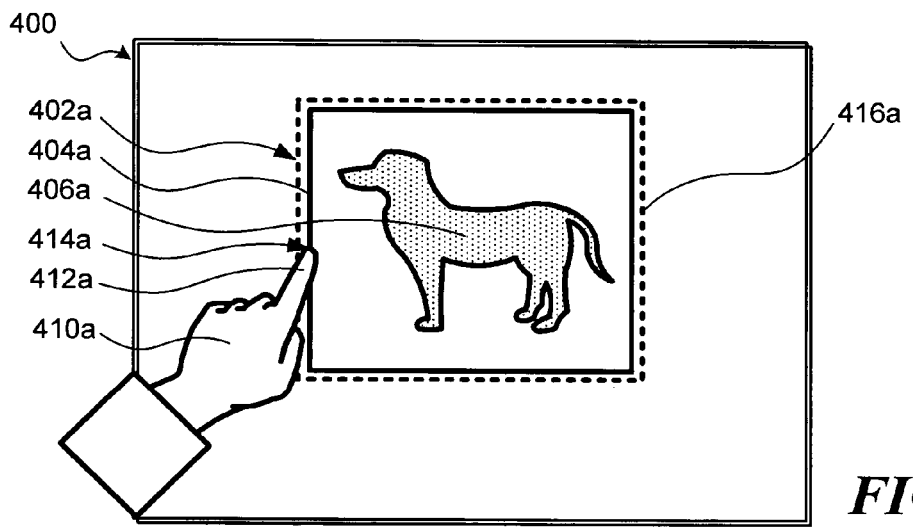
Figure 4C:
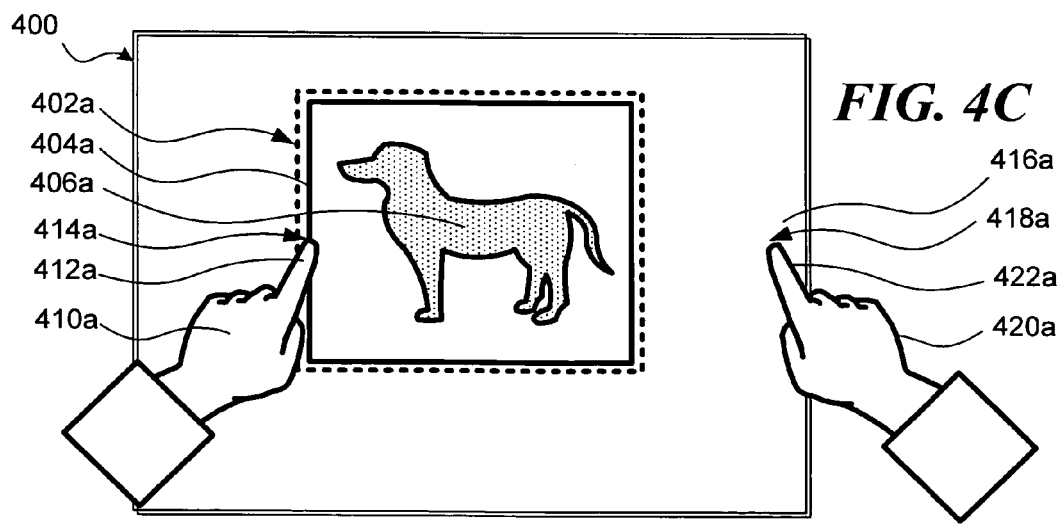

As illustrated in FIGS. 4A-4C, a user resizes an image on an interactive display surface 400 by using physical objects to manipulate the image. It must be emphasized that while the examples shown and discussed herein focus on manipulating images, the present invention is also applicable to manipulating other virtual entities, including irregularly shaped virtual entities and even three-dimensional shapes that are displayed on the interactive display surface. Also, although the examples show how a user's fingers are employed for manipulating virtual entities, any type of physical object can be employed instead of the user's digits or hands. More particularly in the examples discussed below, the user touches the area of interactive display surface 400 where the image is presented with the user's fingers, and, by positioning or moving the user's fingers, changes how the image is displayed. Thus, the user can reposition, resize, rotate, or crop the image presented on interactive display surface 400 without using a keyboard, pointing device, or any other input device other than the fingers touched to interactive display surface 400.

In FIG. 4A, interactive display surface 400 presents an unaltered image 402a. Image 402a includes a boundary 404a encompassing content 406a. In FIG. 4B, the process of altering the image begins with a user applying a physical object to interactive display surface 400. In this example, the user touches a finger 412a of user's hand 410a either to boundary 404a of image 402a, at a first edge 414a or within the boundary of the image. The user may initiate an editing sequence by double tapping with the finger on the interactive display surface, or the use of two physical objects touching the interactive display surface may initiate the editing sequence. If the user moves the finger or other physical object that is touching the image or the boundary of the image, the image will move over the interactive display surface in a corresponding direction and extent, and the relative position of the finger of object within the image will remain constant. Touching the interactive display surface with a second finger or object indicates a user's desire to resize, rotate, or crop the image, depending upon the disposition and motion of the second finger or object relative to the finger or object that first touched the interactive display surface, as described below in further detail.

In the embodiment illustrated in FIG. 4B, upon the user touching boundary 404a of image 402a with finger 412a at a first point 414a (and preferably double tapping with the finger), interactive display surface 400 signals that image 402a is about to be changed by generating a highlighted outline 416a around image 402a. Feedback in response to the user's action in the form of highlighted outline 416a or some other appropriate feedback confirms to the user that the user is initiating a function, so that the user is warned if inadvertently initiating a function the user has not intended.

In FIG. 4C, the user proceeds with resizing image 402a by touching the interactive display surface outside the boundary of the image at a second point 418a with a second finger 422a of the user's other hand 420a. In FIG. 4C, second point 418a is horizontally aligned with first point 414a, thereby indicating the user desires to resize or scale image 402a. However, first point 414a and second point 418a can alternatively be vertically aligned to indicate that the user wants to resize the image.

Figure 4D:
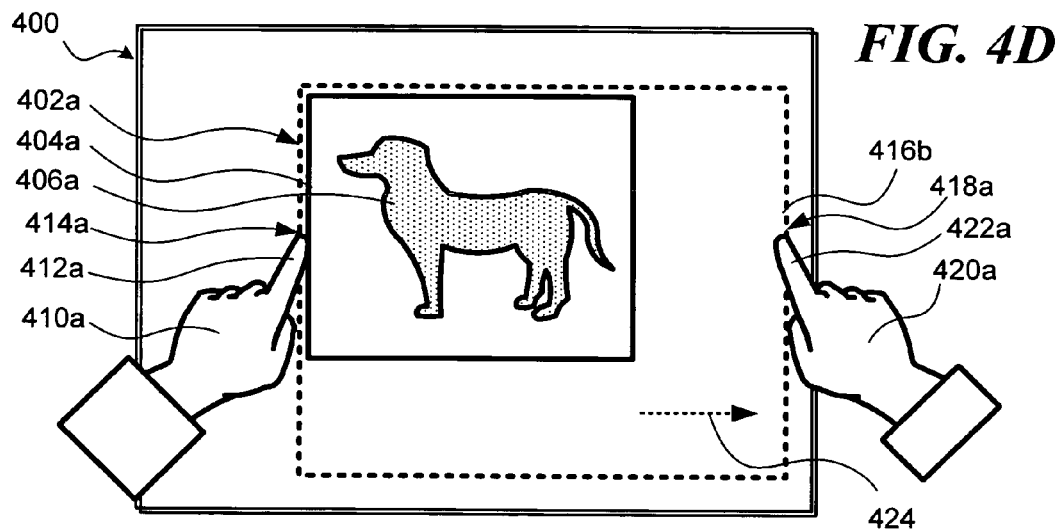

In FIG. 4D, the interactive display surface detects and confirms the proposed resizing of the image in the direction indicated by an arrow 424 by displaying an enlarged highlighted outline 416b that shows the size of the enlarged image that will result from the user's actions. It should be noted that interactive display surface 400 could alternatively immediately resize image 402a, rather than only show the change in size using highlighted outline 416b. Moreover, highlighted outline 416b need not be enlarged, but could be left to show the original size of image 402a as the image is changed in size in response to the user's action.

It also should be noted that highlighted outline 416b indicates that as image 402a is enlarged, its aspect ratio will be preserved in regard to the horizontal and vertical dimensions of image 402a. Preserving the aspect ratio could be a default setting or a user selected setting of the software application running on the interactive display system. Changing the image without preserving its aspect ratio is described below in connection with FIGS. 5A-5C.

Figure 4E:
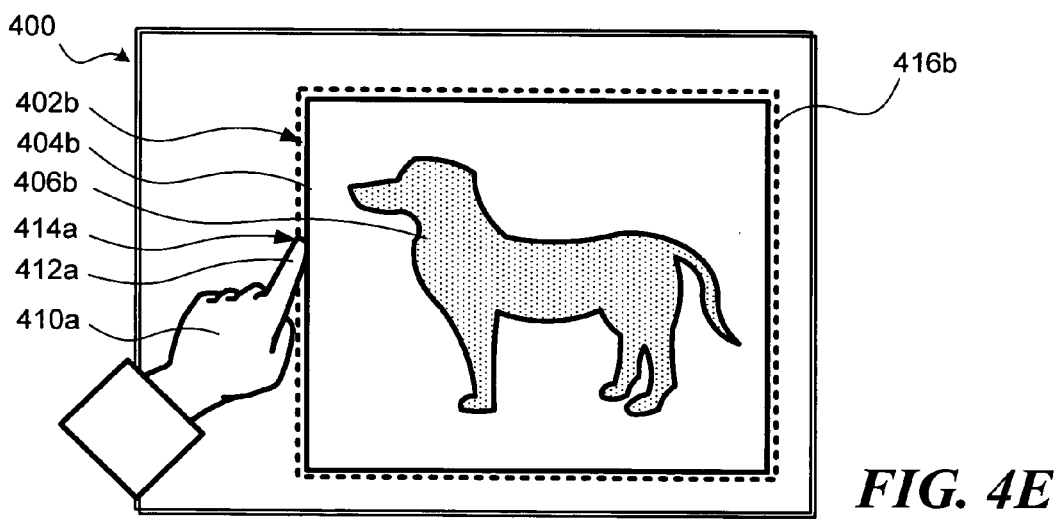

In FIG. 4E, second finger 422a (FIGS. 4C and 4D) is removed from the interactive display surface, indicating that the user accepts the resizing of the image just achieved. In the embodiment of the invention shown in FIG. 4E, removal of the second finger—like the removal of one's fingers from a chess piece during a chess match—signals to interactive display surface 400 that the indicated change is to be made. As a result, resized image 402b is enlarged to fit an area previously indicated by highlighted outline 416b. More specifically, outline 404b is enlarged to correspond with highlighted outline 416b, and content 406b is enlarged to correspond with outline 404b. Highlighted outline 416b remains as long as user's first finger 412a engages first edge 414a of image 404b to indicate that the user can continue to resize image 402b, should the user wish to reengage resized image 402b with another finger or other physical object. It should be noted that, in the embodiment illustrated in FIGS. 4A-4E, image 402a (FIGS. 4A-4D) is resized and replaced with resized image 402b (FIG. 4E) without the user moving finger 412a. However, the user could also move either of fingers 412a and 422a to resize an image; the user is not limited to resizing an image by positioning or moving only one finger or other object at one time; this point is described in more detail below.

Figure 4F:
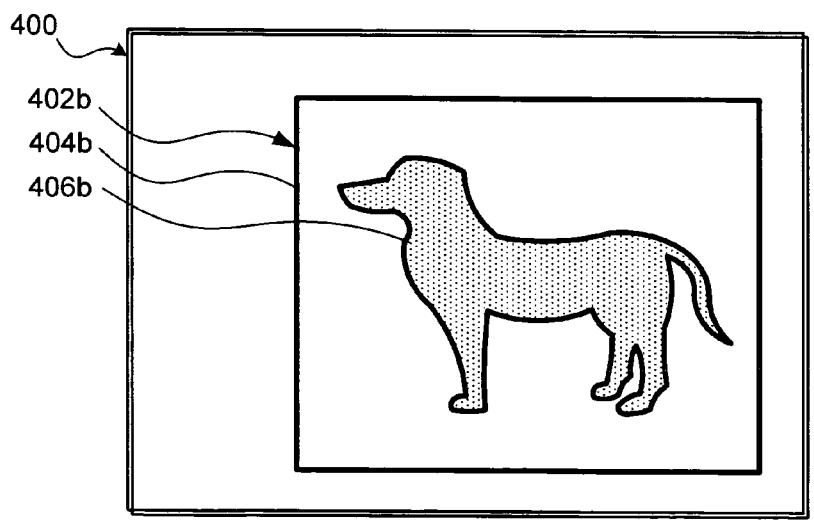

In FIG. 4F, the user removes finger 412a and hand 410a from interactive display surface 400. As a result, highlighted outline 416*b* disappears, leaving resized image 402*b*. Resized image 402*b* includes appropriately rescaled and resized outline 404*b* and content 406*b*. As shown in FIGS. 4A-4F, removing fingers 412*a* and 422*b* signals the completion of the resizing operation. It should be noted that interactive display surface 400 could employ undo and redo functions that are activated using virtual buttons on interactive display surface 400, or another input device to rescind and redo one or more previous actions.

Figure 4G:
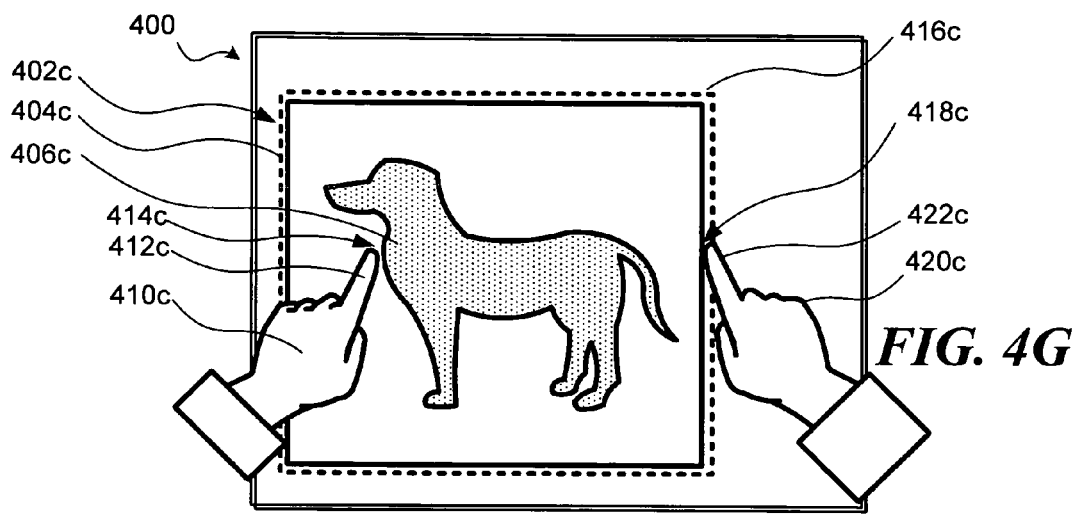
Figure 4H:
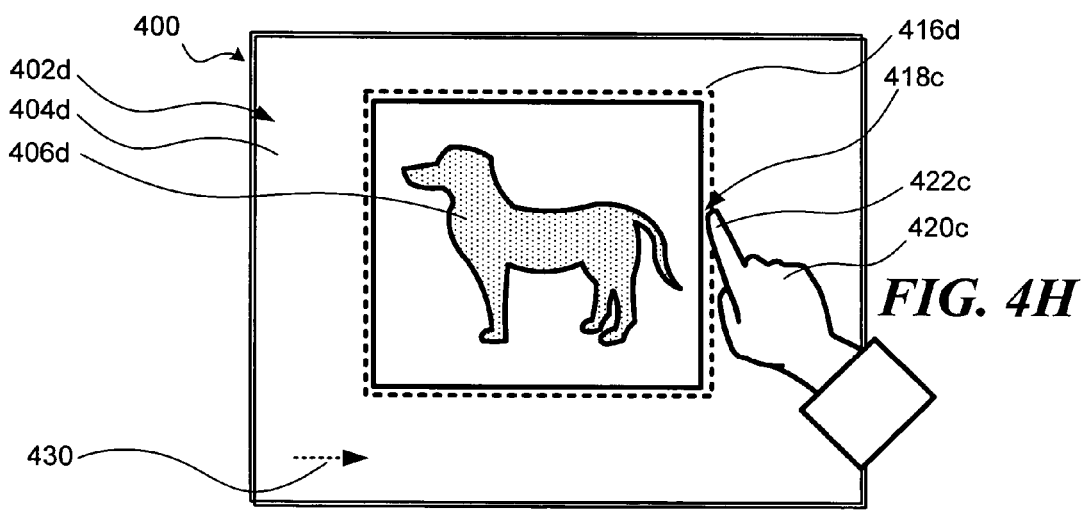
Figure 4I:
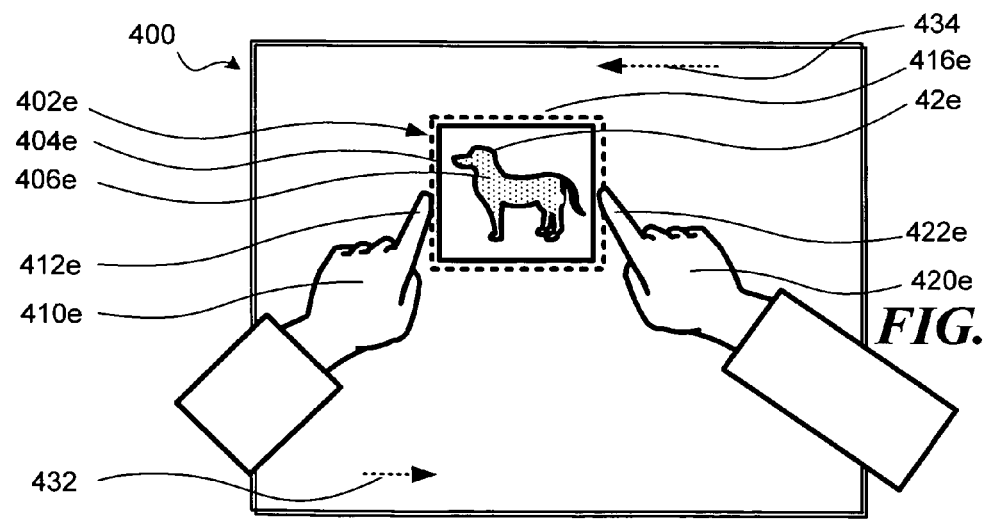

For the sake of illustration, FIGS. 4G-4I show variations on resizing of the image depicted in FIGS. 4A-4F. In connection with FIG. 4D, as user's second finger 422*b* was positioned to resize image 402*a*, highlighted outline 416*b* was changed to show how image 402*a* would be resized, although image 402*a* was resized later, only after the resizing operation was completed by the user. However, as shown in FIGS. 4G-4H, an image can be resized immediately in response to position and/or movement of a finger or other physical objects, to indicate the effect of a resizing operation.

In FIG. 4G, an image 402*c* includes a boundary 404*c* and content 406*c*. A first finger 412*c* of user's first hand 410*c* is placed at a first point 414*c* within image 402*c* to initiate a resizing operation. A second finger 422*c* of the user's other hand 420*c* is placed on an edge 418*c* of image 402*c*. A highlighted outline 416*c* is generated by the interactive display surface to confirm that a resizing operation is being initiated. However, unlike highlighted outline 416*b* (FIG. 4D), highlighted outline 416*c* is not a surrogate for monitoring the resizing operation of image 402*c*.

In FIG. 4H, the user has withdrawn hand 410*c*, and image 406*d* has been produced as a result of the resizing based upon the spacing between the two horizontally aligned points touched by the user in FIG. 4G. Smaller image 402*d* was immediately formed to show the effect of the resizing operation. Thus, it is clear that the present invention may be used both to reduce and enlarge the size of images.

FIG. 4I shows one additional variation. In FIG. 4I, both first finger 412*e* of user's first hand 410*e* and user's second finger 422*e* of the user's other hand 420*e* have been moved in the direction of arrows 432 and 434, respectively, to resize the image. The image is resized so that its center remains centered between the two points at which the user has contacted the interactive display surface.

In FIGS. 4A-4I, images were resized while preserving both the aspect ratio of the images and maintaining the entirety of the content of the images. The present invention also permits images to be otherwise manipulated to provide additional functionality.

Figure 5A:
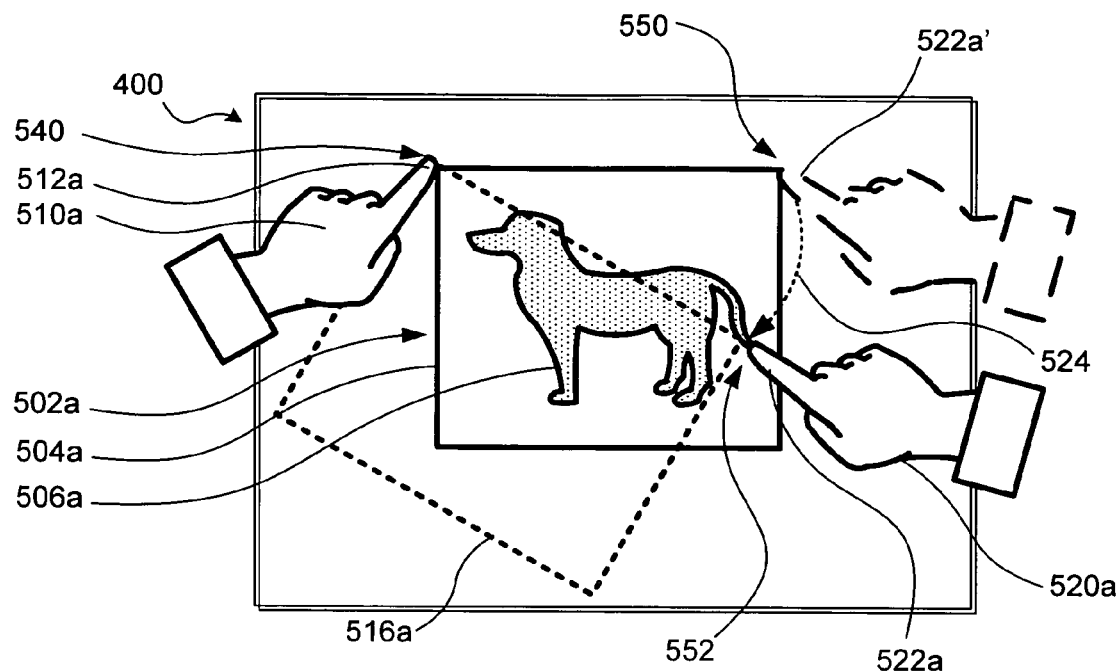
FIGS. 5A-5D illustrate an image being resized on the interactive display surface in one or two dimensions by a user's fingers, depending on where the user's fingers engage the image.
Figure 5B:
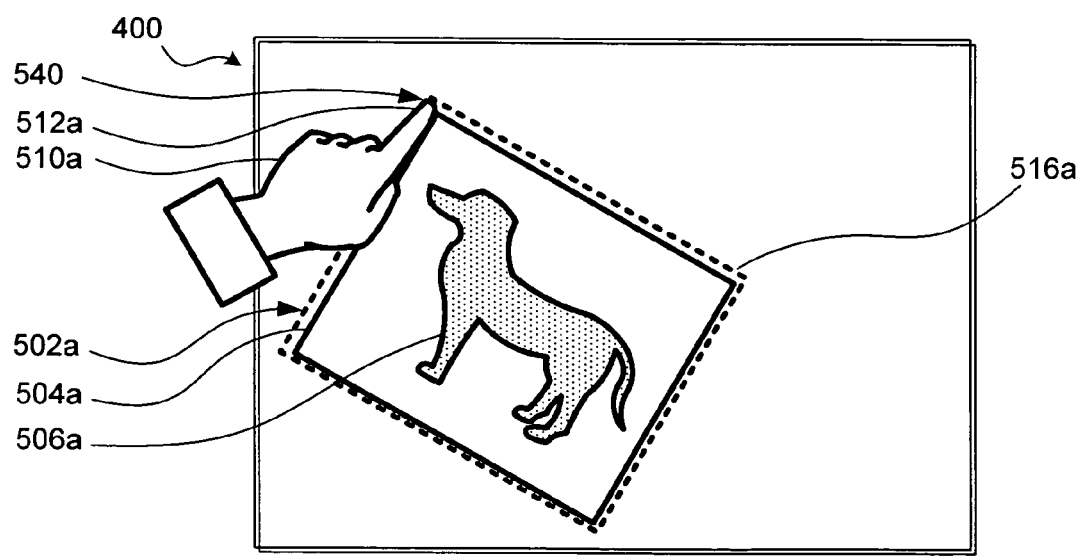
Figure 5C:
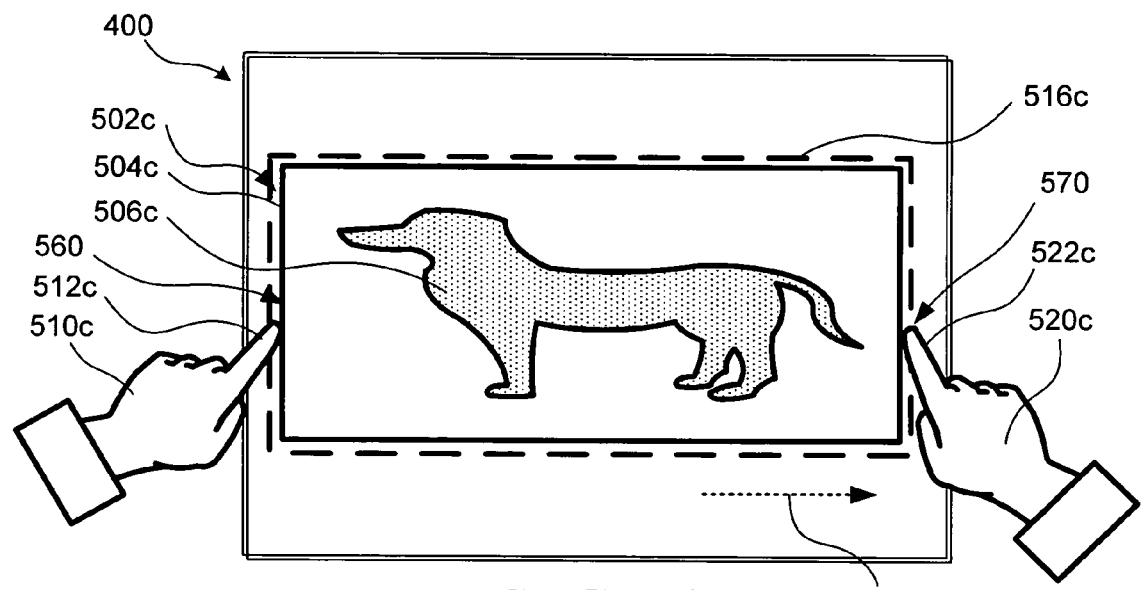
Figure 5D:
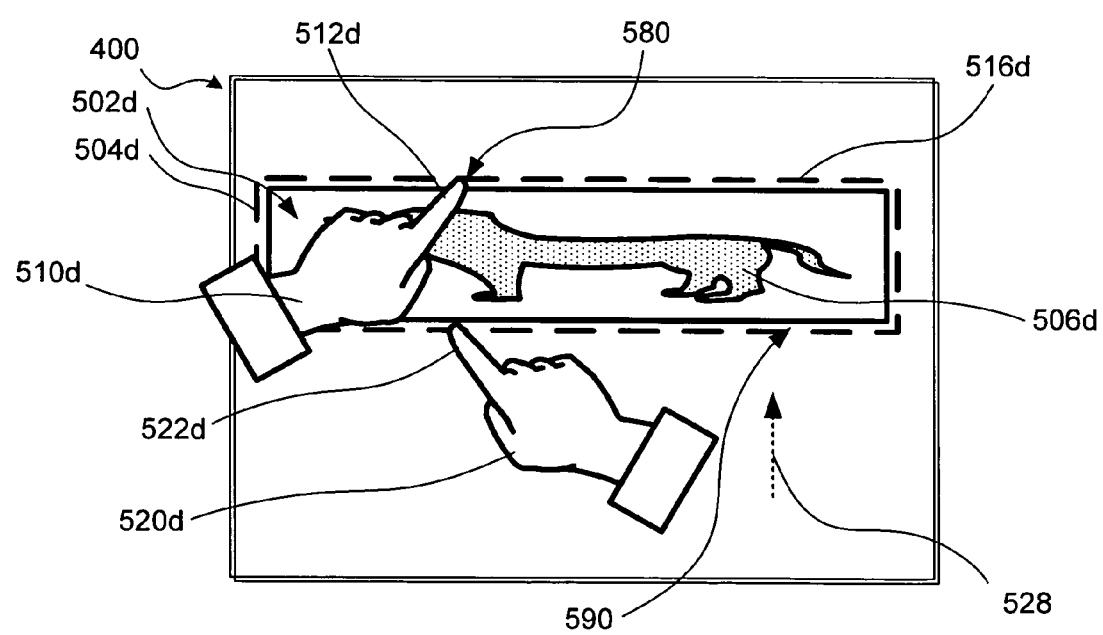

In FIGS. 5A and 5B, an image is rotated, while in FIGS. 5C-5D, images are resized in only one dimension, based on the settings selected by the user. In FIG. 5A, an image 502*a* is rotated clockwise through an angled determined by an angle subtended by the user's finger as it moves from an initial contact at a point 550, which is in horizontal alignment with another finger, to a second point 552 that is below the initial contact location. Image 502*a* includes a boundary 504*a* and content 506*a*. With a first finger 512*a* of a user's first hand 510*a*, a user touches an upper left corner 540 of image 502*a*. With a second finger 522*a*' of a user's second hand 520*a* (shown in phantom view), the user touches first point 550 near the upper right corner of image 502*a* and moves the second finger downwardly in an arc 524. A highlighted outline 516*a* indicates that one or more aspects of image 502*a* are to be changed when the user touches first point 550. The user effects the change by dragging second finger 522*a* downwardly in arc 524, causing highlighted outline 516*a* to rotate about corner 540 to indicate the rotated outline of the image that will result from the user's actions.

As shown in FIG. 5B, when second finger 522*a* (FIG. 5A) is removed from contact with the interactive display surface, image 502*a* appears within highlighted outline 516*a*. When the image is rotated as shown in FIGS. 5A-5B, the size can also be changed, depending upon where the user initially contacts the image with the two fingers. Also, the finger that is not moved in an arc determines the center of rotation of the image.

Persons familiar with graphical user interface applications used in drawing programs or in image processing programs will understand that, in most such applications, dragging a corner of a rectangular object preserves the aspect ratio of the object as the window size is changed. In contrast, clicking and dragging on an edge of an object will typically change the aspect ratio of the object, unless a software constraint has been set to maintain the aspect ratio. The resizing of an image without maintaining the aspect ratio is illustrated in FIGS. 5C and 5D.

FIGS. 5C and 5D illustrate how, if the options to resize without preserving the aspect ratio has been selected, objects can be used to resize an image, which can distort the content relative to its appearance before the resizing occurred. More particularly, in FIG. 5C, image 502*c* includes a boundary 504*c* and a content 506*c*. With a first finger 512*c* of a user's first hand 510*c*, the user engages image 502*c* by touch a point 560. With a second finger 522*c* of a second hand 520*c*, the user has touched the interactive display surface at a second point 570, which is generally aligned with first point 560, causing the image to be elongated in the direction indicated by an arrow 526, but the vertical dimension has not been affected. A highlighted outline 516*c* indicates that one or more aspects of image 502*c* has been changed. In this example, content 506*c* appears distorted in the horizontal direction.

Similarly, in FIG. 5D, an image 502*d*, having a boundary 504*d* and a content 506*d*, is reduced in vertical, but not horizontal size, by a user's manipulations. With a first finger 512*d* of a user's first hand 510*d*, the user has engaged an edge 580 of image 502*d*. With a second finger 522*d* of a second hand 520*d*, the user has touched a second point 590 within image 502*d*, causing the vertical height of the image to be reduced, as indicated by an arrow 528, but without changing the horizontal length of the image. A highlighted outline 516*d* indicates that one or more aspects of image 502*d* have been changed. Again, the image appears to be even more distorted in the horizontal direction.

As previously noted, a user can resize an image after touching the interactive display surface by moving one hand or both hands at the same time, and a user is not limited to only using a second finger to resize an image. The appearance and format of the highlighted outlines when preserving the aspect ratio or not can provide feedback to a user as to the type of operation that will be initiated after placement of the second physical object (or finger) on the interactive display surface. Accordingly, for example, when a user inadvertently applies a finger to interactive display surface 400 in a way that will change the aspect ratio of an image when the user intended to preserve the current aspect ratio, the user can withdraw the finger, reset the option, and start again to perform the intended operation.

Figure 6A:
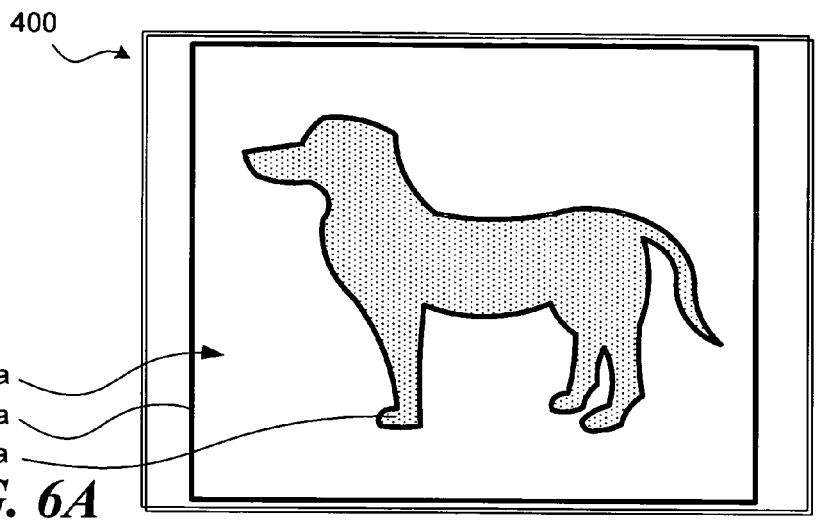
FIGS. 6A-6E illustrate an image being cropped on the interactive display surface, based upon the positions where a user's fingers touch the interactive display surface.
Figure 6B:
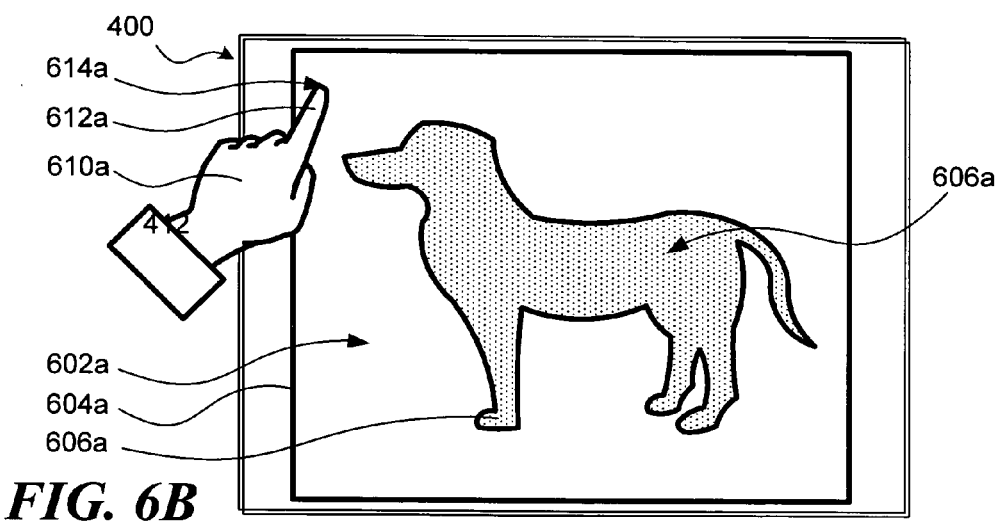

In addition to changing a size of an image, with or without changing its aspect ratio, images can be altered in other ways using the present invention. For example, images can be cropped using the invention as shown in FIGS. 6A-6E. FIG. 6A shows an image 602*a* displayed on interactive display surface 400. Image 602*a* includes a boundary 604*a* encompassing a content 606a. In FIG. 6B, the process of altering the image begins with a user applying a physical object to interactive display surface 400. In this example, the user touches a first finger 612a of a hand 610a inside a boundary 604a of image 602a, at a first point 614a. In one embodiment of the present invention, touching a finger or applying another physical object in contact with the interactive display surface indicates that the user intends to manipulated the image. Alternatively, the user may need to double tap the interactive display surface with the finger or object to initiate the manipulation process.

Figure 6C:
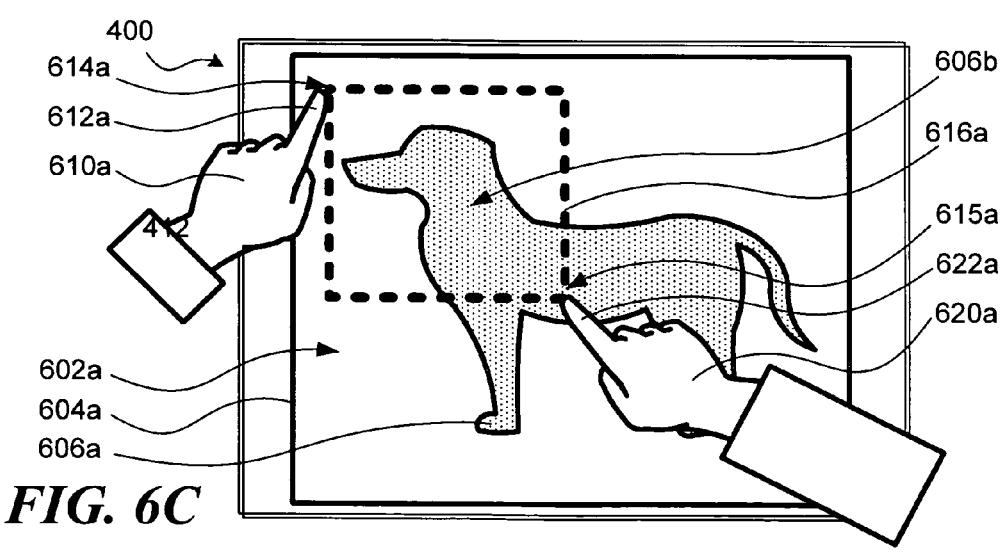

In FIG. 6C, a second finger 612a of a second hand 610a is placed on interactive display surface 400 at a second point 615a that is not vertically or horizontally aligned with first point 614a. The interactive display table responds to the second finger touching the interactive display surface at two points that are not generally vertically or horizontally aligned by entering the cropping mode of virtual entity manipulation.

A highlighted outline 616a outlines a content 606b of original image 602a to be included in a new image, based on placement of second finger 612a in FIG. 6C. More particularly, highlighted outline 616a is now defined by first point 614a where first finger 612a is positioned and second point 615a (again, generally not horizontally or vertically aligned), which corresponds to the position of second finger 612a. Highlighted outline 616b thus responds to the placement of second finger 622a at second point 615a (or if second finger 622a was originally placed at another position and dragged to second point 615a) by indicating a cropping of the image based upon the location of these first and second points on the image.

Figure 6D:
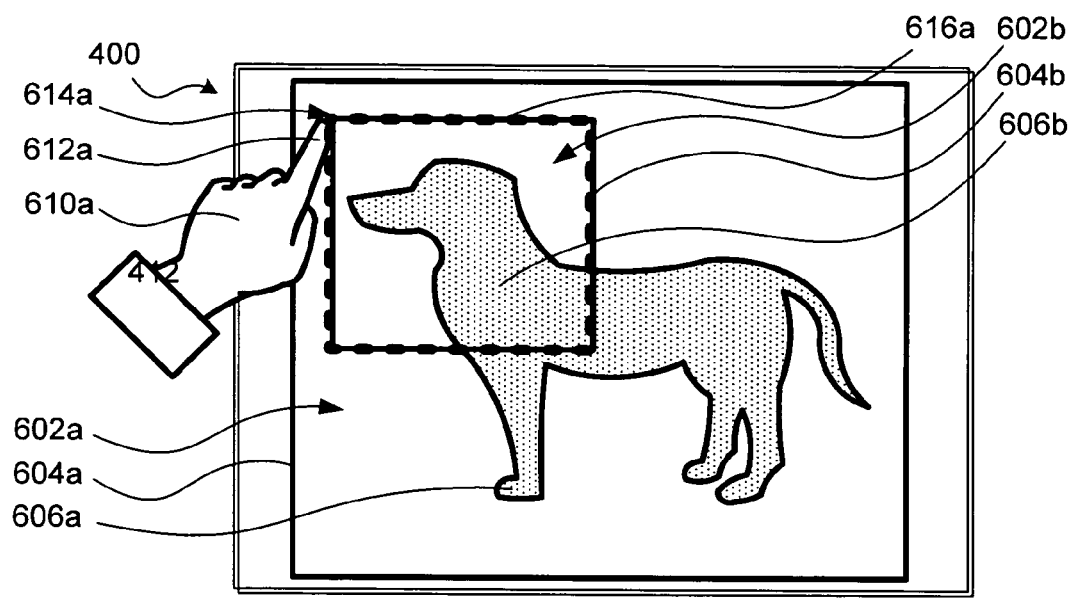

In FIG. 6D, second finger 622a (FIG. 6C) is removed from interactive display surface 400. With the removal of second finger 622a, a new image boundary 604b appears, containing a new image content 606b, and thus, representing new image 602b that will remain once cropping is complete. A new boundary 604b is coextensive with highlighted outline 616a. Highlighted outline 616a remains in place while first finger 612a remains on interactive display surface 400, to indicate that the cropping operation can readily be modified by again touching the interactive display surface with the second finger or other second object (and by touching and then dragging the highlighted outline to achieve the desired cropped area. In addition, by dragging first finger 612a over the interactive display surface with first finger 612a, the relative position of the highlighted outline upon image 602a can be changed so that the cropped portion of the original image can readily be adjusted to suit the user. Original boundary 604a and original content 606a of original image 602a remain visible on interactive display surface 400, to illustrate the difference between original image 602a and new image 602b and to enable the user to make adjustments to the cropped region and the location of the cropped region.

Figure 6E:
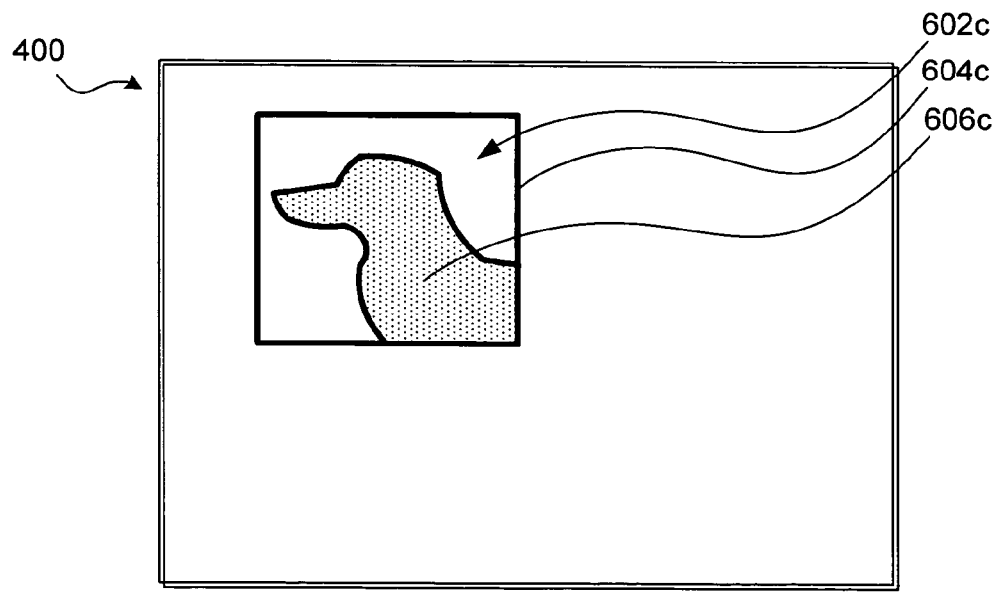

In FIG. 6E, first finger 612a of user's first hand 610a (FIGS. 6B-6D) is removed from interactive display surface 400, thereby completing the cropping operation. New image 602b, with boundary 604b and content 606b, remains on interactive display surface 400. New image 602a can be cropped again, rotated, or resized, as described above.

Although in the cropping procedure illustrated in FIGS. 6A-6E, manipulation of original image 602a was accomplished by positioning or moving only one hand, cropping can employ movements of both hands. Although not shown in FIGS. 6A-6E, undo and redo functions may be provided to enable a user to rescind a prior operation or redo the operation, respectively. Such functions may be accessed by activating virtual buttons (not shown) presented on the interactive display surface or through another input device associated with interactive display surface 400.

Figure 7A:
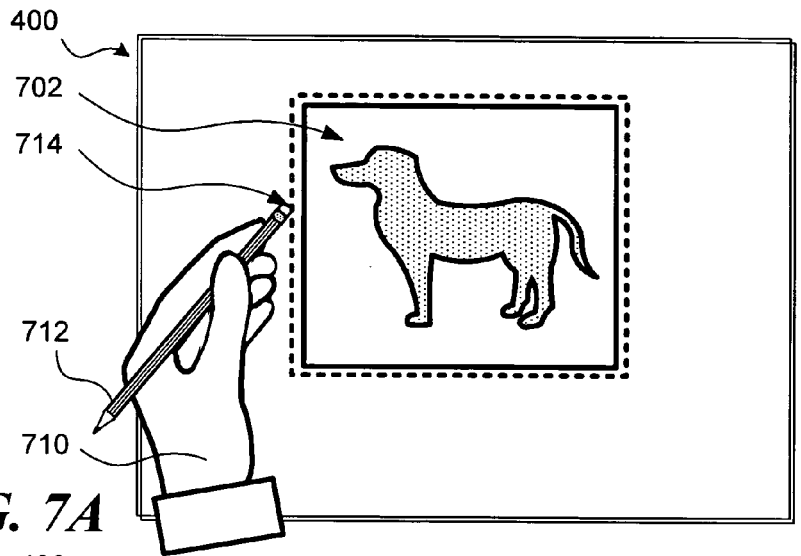
FIGS. 7A-7C illustrate an image being resized on the interactive display surface using physical objects instead of or in addition to a user's fingers.
Figure 7B:
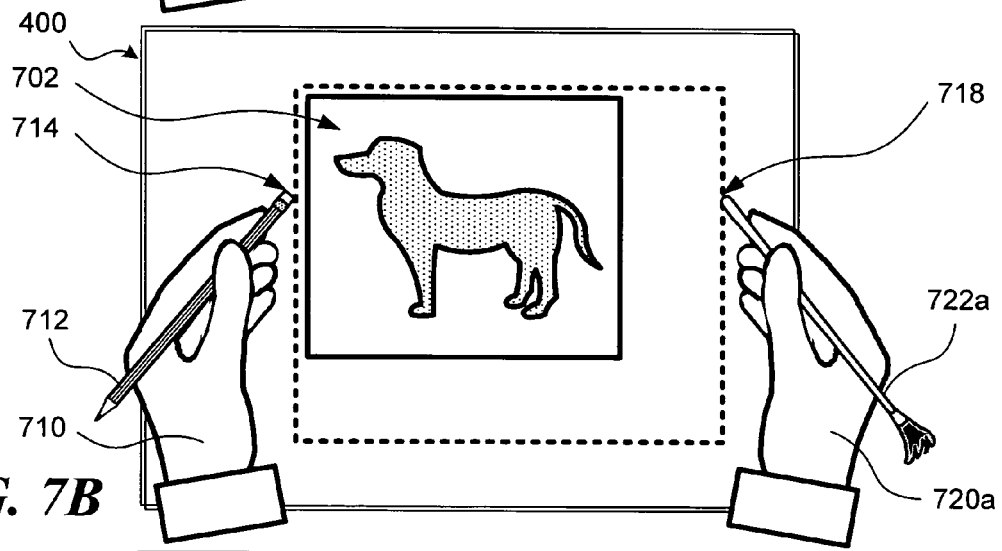
Figure 7C:
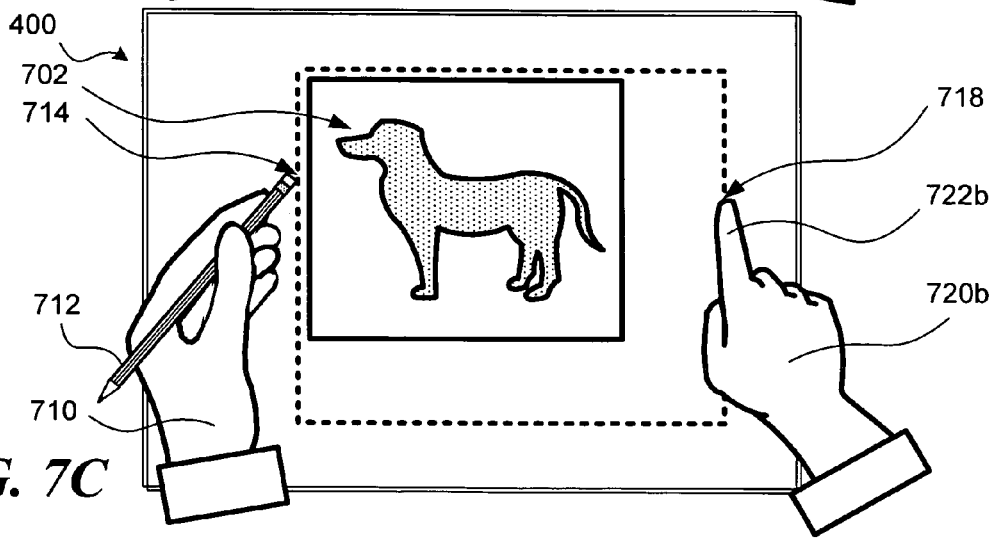

FIGS. 7A-7C illustrate that manipulation of images may be accomplished using physical objects other than or in addition to a user's fingers. In FIG. 7A, interactive display surface 400 displays an image 702. In order to manipulate image 702, a first hand 710 holds a first inanimate physical object 712 (such as a pencil eraser) that is touched to a first point 714 the interactive display surface to manipulate image 702. Similarly, with a second hand 720a, the user holds a second inanimate object 722a. In this example, second inanimate object 722a is a paint brush, and the user directs the non-bristle end of second inanimate object 722a to a second point 718 on interactive display surface 400 to manipulate image 702. Thus, different inanimate objects 712 and 722a may be used. Furthermore, as illustrated in FIG. 7C, the user can manipulate image 702 with first inanimate object 712, which is held in user's first hand, and using a finger 722b of the user's second hand. In accord with the present invention, any number or combination of physical objects may be used to manipulate an image, so as to resize, rotate, move, or crop the image or any other type of virtual entity that is presented on the interactive display surface.

Using Physical Objects to Change Application Attributes

In addition to using physical objects such as fingers and inanimate objects to manipulate images to change the images' size or crop the images, the present invention enables a user to use physical objects to adjust other attributes employed in an application executing in connection with the interactive display surface.

Figure 8A:
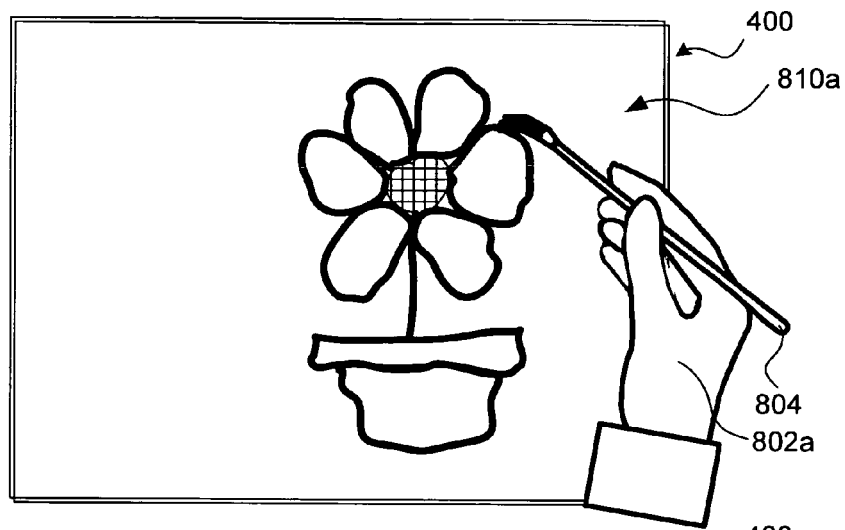
FIGS. 8A-8F illustrate an attribute of an application being changed by a user's fingers manipulating a property selection range presented on the interactive display surface.

In FIG. 8A, a user has used a first hand 802 to direct a paint brush 804 to create an image 810 on interactive display surface 400. One manner by which such a physical object as the paint brush 804 may be used to create image 810 on interactive display surface is described in a co-pending patent application entitled, "Using Size And Shape Of A Physical Object To Manipulate Output In An Interactive Display Application," Ser. No. 10/879,872, which was filed on Jun. 28, 2004.

Figure 8B:
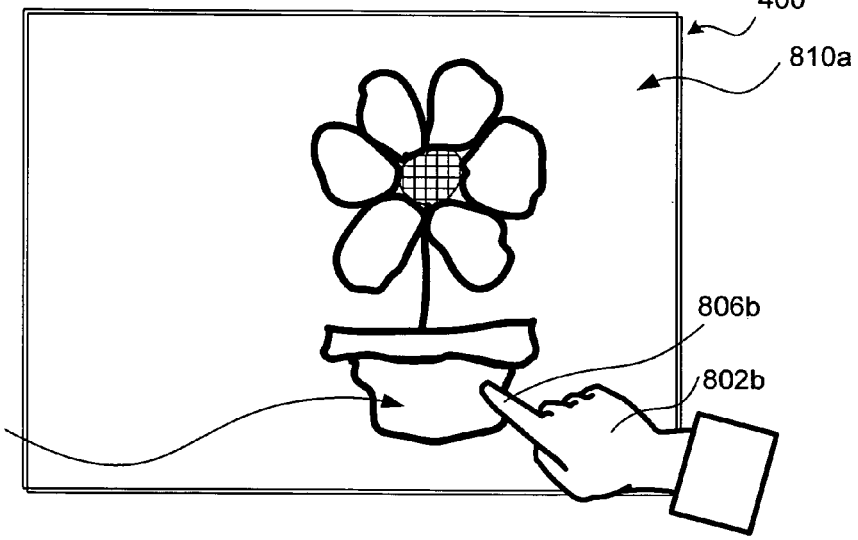
Figure 8C:
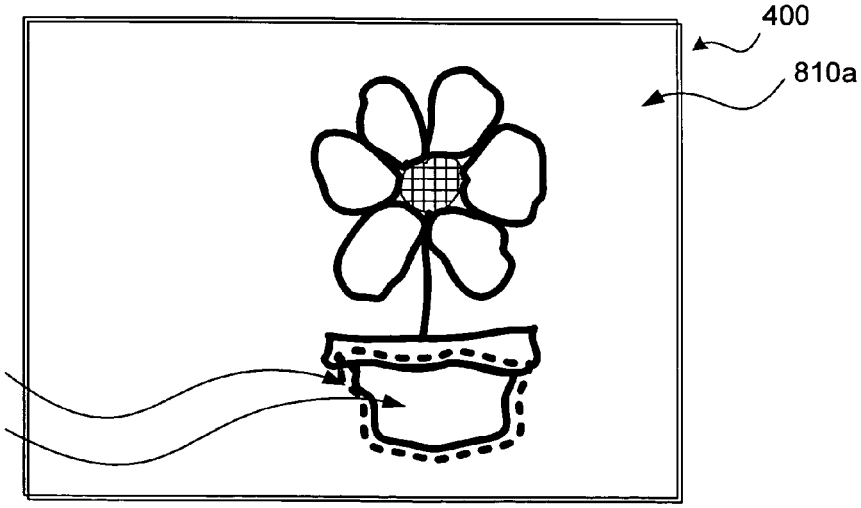

In order to begin manipulation of attributes of an image, with a first hand 802b, the user identifies a portion 812a of image 810. In the example illustrated in FIG. 8B, the user selects a portion 812a of image 810 by touching the portion with a finger 806b. Identification of a portion of an image—or an aspect of any other application executing on interactive display surface 400—for which an attribute is to be changed using the present invention can be performed in any manner understood by interactive display surface 400 and/or the application executing. For example, as an alternative to the method just described, an application may prompt a user for attribute changes during phases of application execution. In FIG. 8C, a highlighted outline 814 indicates an attribute is to be changed for a selected portion 812a of an image 810a.

Figure 8D:
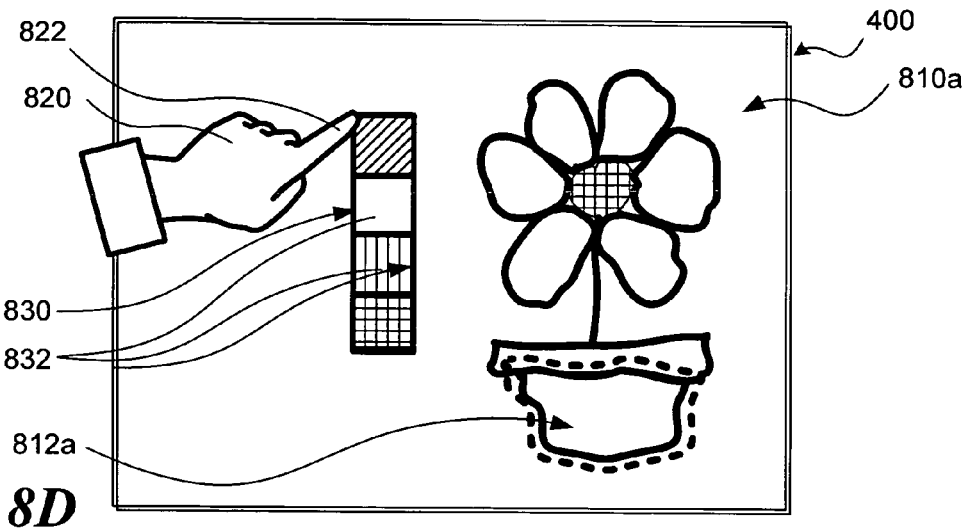

In FIG. 8D, a user places a second finger 822 from a second hand 820 on interactive display surface 400. Because selected portion 812a of image 810a was selected, in response to a prompt, or because it was triggered by another event, when the user places second finger 822 on the interactive display surface, property selection range 830 is presented on interactive display surface 400. Property selection range 830 may be a menu, a palette, a virtual slider control, or some other virtual control panel that includes an array of options. In FIG. 8D, property selection range 830 includes a color or pattern palette presenting a number of attribute choices 832 from which the user may choose selected portion 812a.

Property selection range 830 is generated at a position where user's second finger 822 was disposed adjacent to interactive display surface 400. Accordingly, the user can control where property selection range 830 will be presented by choosing where second finger 822 touches the interactive display surface. The property selection range is presented at a default size, but the present invention also enables a user to control a size of property selection range 830, as described below in connection with FIGS. 9A-9D and FIGS. 10A-10D.

Figure 8E:
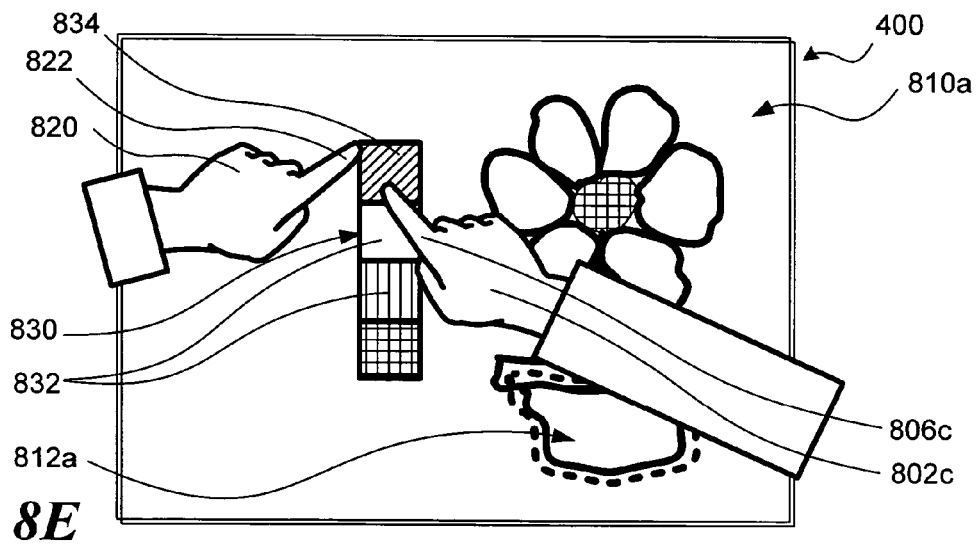
Figure 8F:
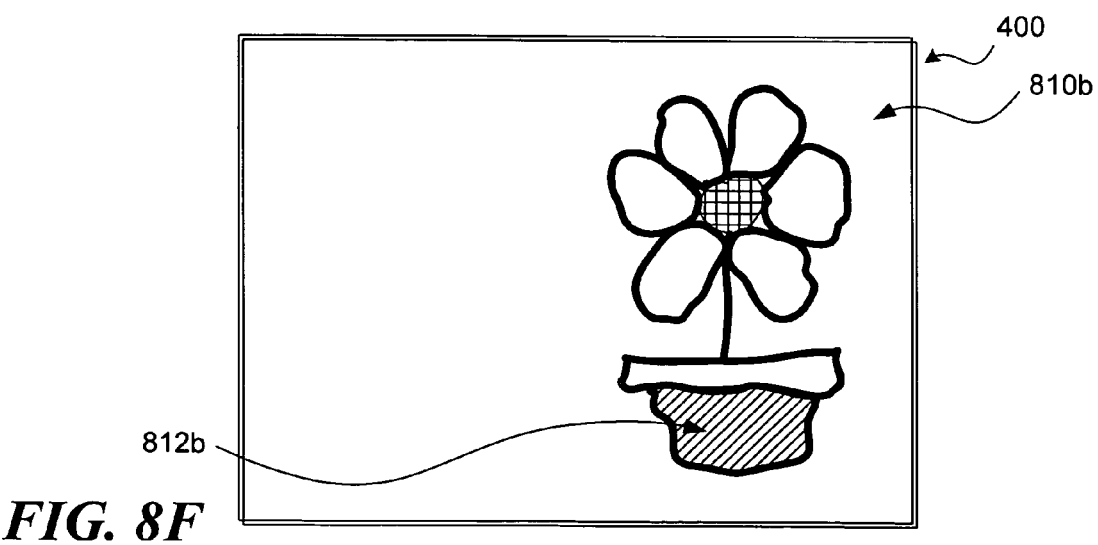

In FIG. 8E, the user employs a first hand 802c to make a selection from property selection range 830. The user places first finger 806c adjacent to interactive display surface 400 to make a selection. The user can slide first finger 806c to a desired choice or place first finger 806c directly on the user's selection. In FIG. 8E, the user selects attribute choice 834. As shown in FIG. 8F, the user's selection is given effect once the user removes hands 820 and 802c, and thus, fingers 822 and 806c, from interactive display surface 400. A selected portion 812b is re-shaded in accordance with the user's selection of attribute 834, resulting in a final image 810b.

It will be appreciated that property selection range 830 (FIGS. 8D and 8E) may be presented in a number of forms to facilitate a wide range of control types. As described in connection with FIGS. 8D-8F, property selection range 830 may include a palette, enabling a user to select among colors or patterns for filling or shading an image that the user has created. Any change made by the user can be propagated to the target object immediately to preview the effect of the change. In such an application, the property selection range may also include line thicknesses and line patterns. In other applications, the property selection range can take a number of different forms. Thus, for example, if the application presented on interactive display surface 400 is a photo viewing application, the property selection range may present virtual slider controls to change a brightness, contrast, intensity, or color temperature of an image. If the application is a music player program, property selection range 430 may present virtual slider controls with which a user can control volume, bass, treble, loudness, or other attributes of the sound. If the application is a motion-video playback application, a virtual slider could be presented as a jog control to provide a user with continuous forward and reverse playback control. Accordingly, it will be clear that any number of different types of attribute controls may be represented in the form of a property selection range.

Also, the property selection range can be invoked with almost any type of physical object. For example, instead of a user employing fingers to call up a property selection range and to select an option from it, a user can use a pencil or paint brush, as described above in connection with FIGS. 7B and 7C, or any number of other types of physical objects.

Sizing of Property Selection Ranges with Physical Objects

As described above, property selection ranges are preferably presented on the interactive display surface near where a physical object is disposed on or adjacent to the interactive display surface. In addition, in one embodiment, a property selection range is invoked by successively placing two physical objects on an interactive display surface, and the property selection range is presented in the area bounded or otherwise indicated by the two physical objects. Accordingly, a user can cause the property selection range to be presented at a location and in a size that the user chooses. In this way, the user can avoid having the property selection range overlap an object of interest presented on the interactive display surface. In addition, the user can control the breadth of a range of control, to control the sensitivity of interactive display surface to movement of a physical object used to select and vary an attribute within the property selection range.

Figure 9A:
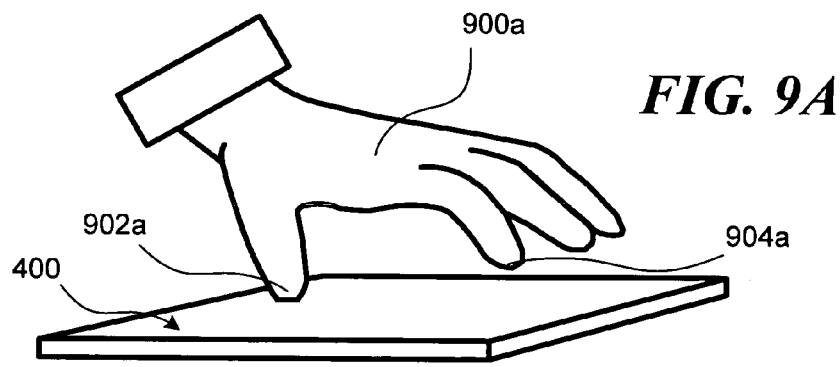
FIGS. 9A-9D illustrate a property selection range being presented and resized in accordance with placement of a user's fingers on the interactive display surface.
Figure 9B:
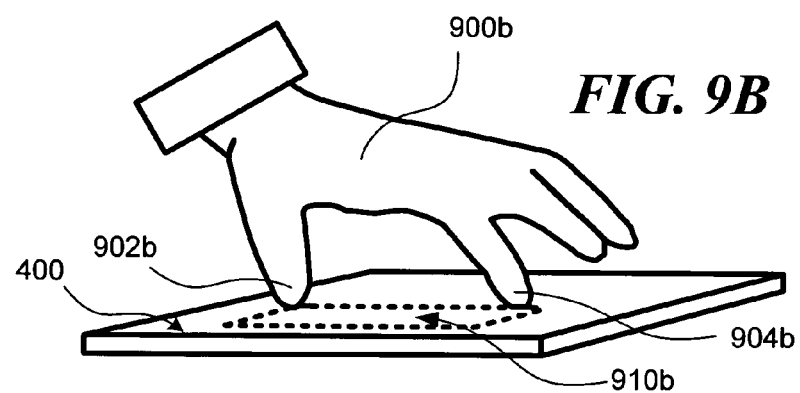

In FIG. 9A, a user's hand 900a rests above interactive display surface 400 with a thumb 902a disposed adjacent to the interactive display surface. No property selection range is yet generated on interactive display surface 400, because interactive display surface 400 awaits a second physical object being disposed adjacent to the interactive display surface to mark a size of the property selection range. In FIG. 9B, the user positions an index finger 904b adjacent to interactive display surface 400. Thus, thumb 902b and index finger 904b are both disposed adjacent to interactive display surface 400. As a result, a property selection range 910b is presented on the interactive display surface in the area between thumb 902b and index finger 904b.

Figure 9C:
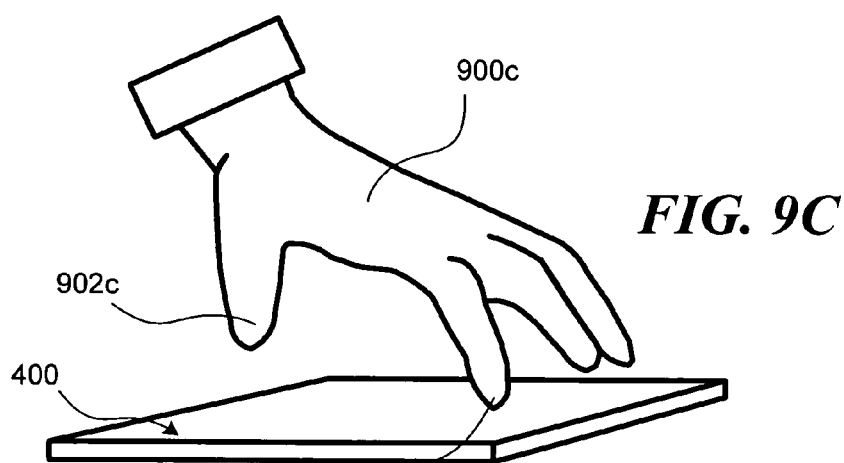
Figure 9D:
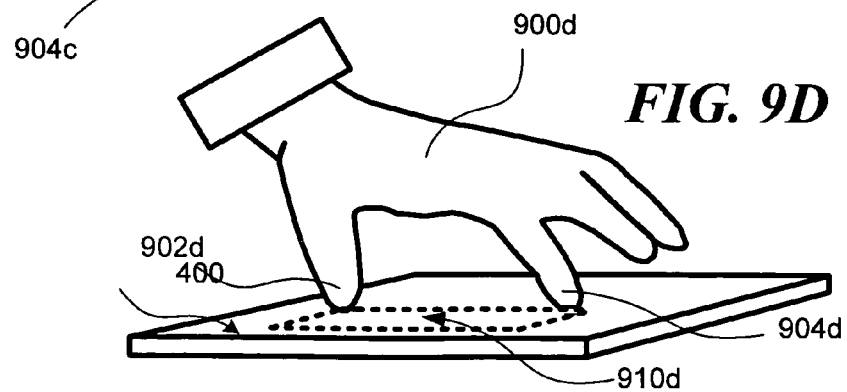

Of course, in the present invention, the user is not restricted to calling up a property selection range by first disposing a thumb adjacent to the interactive display surface. In FIG. 9C, a hand 900c rests above interactive display surface 400 with an index finger 904c disposed adjacent to the interactive display surface. No property selection range is yet presented on interactive display surface 400 because interactive display surface 400 awaits a second physical object being disposed adjacent to the interactive display surface to mark an opposite end of the property selection range, to determine its size. In FIG. 9D, the user disposes user's thumb 902d adjacent to interactive display surface 400. Thus, index finger 904d and thumb 902d are both disposed adjacent to interactive display surface 400. As a result, property selection range 910d is presented in the area between indicated by index finger 904d and thumb 902d.

Figure 10A:
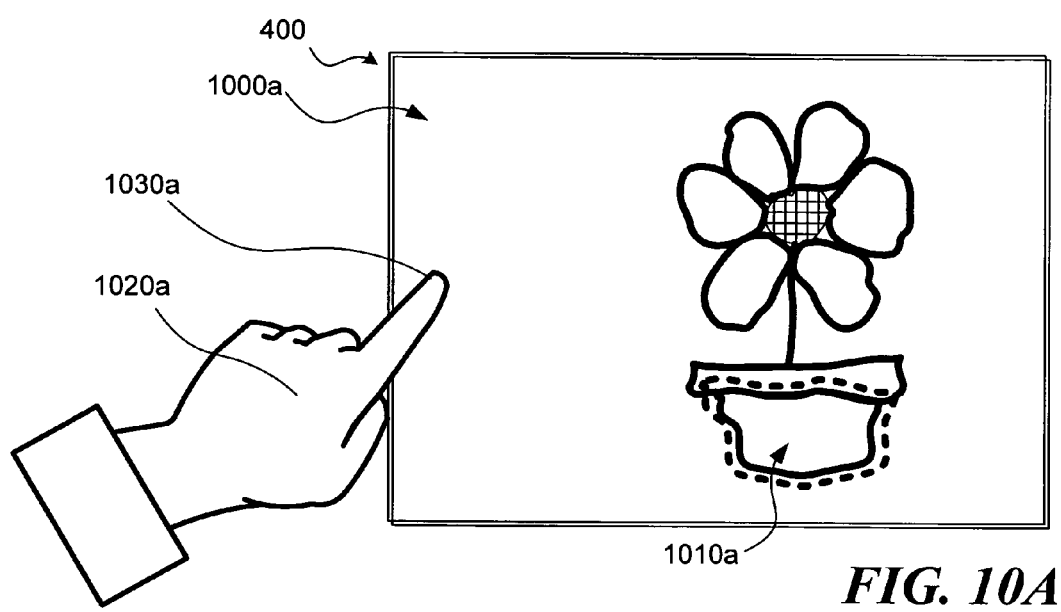
FIGS. 10A-10D illustrate a perspective view of a user's hand engaging an interactive display surface to position, size, and engage a property selection range.
Figure 10B:
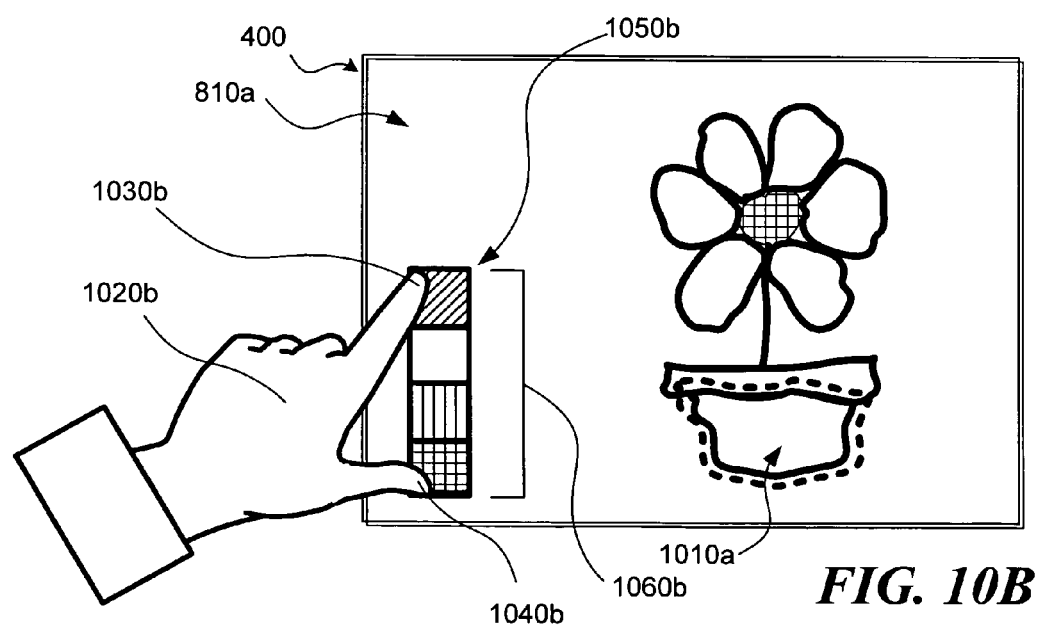

FIGS. 10A-10D further illustrate a user's control of the placement and sizing of a property selection range presented on the interactive display surface. In FIG. 10A, an image 1000a with a portion 1010a selected for input of an attribute change is presented on interactive display surface 400. A first finger 1030a of a first hand 1020a is disposed adjacent to interactive display surface 400. As described above in connection with FIGS. 9A-9D, however, disposing a single finger adjacent to interactive display surface 400 does not call up a property selection range. However, in FIG. 10B, a thumb 1040b is also placed adjacent to interactive display surface 400. Thus, with both first finger 1030b and thumb 1040b of user's first hand 1020b disposed adjacent to interactive display surface 400, a property selection range 1050b is presented on the interactive display surface. As also described above, property selection range 1050b is sized to fit a region 1060b determined by the distance between the first and second physical objects disposed adjacent to interactive display surface 400. In this case, the first and second physical objects include first finger 1030b and thumb 1040b, and thus, region 1060b, which is covered by property selection range 1050b, spans an area determined by the distance between first finger 1030b and thumb 1040b.

Figure 10C:
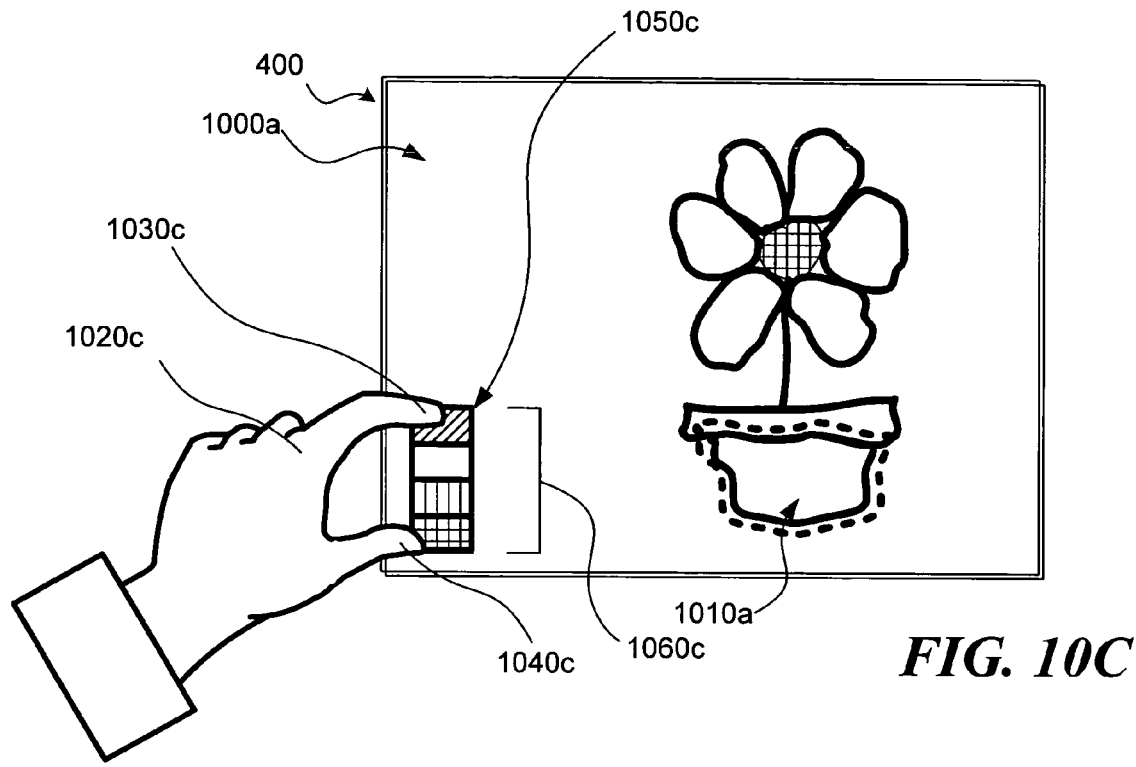

FIG. 10C shows a result of the user moving the fingers on interactive display surface 400 closer together. Again, with portion 1010a of image 1000a selected for an attribute change, the user positioning of first finger 1030c and thumb 1040c adjacent to interactive display surface 400 results in a property selection range 1050c being presented on interactive display surface 400. In contrast to FIG. 10B, however, in FIG. 10C, the user places first finger 1030c and thumb 1040c more closely together. As a result, a region 1060c, which is defined by the distance between first finger 1030c and thumb 1040c, is smaller in size. Consequently, property selection range 1050c also is smaller.

Figure 10D:
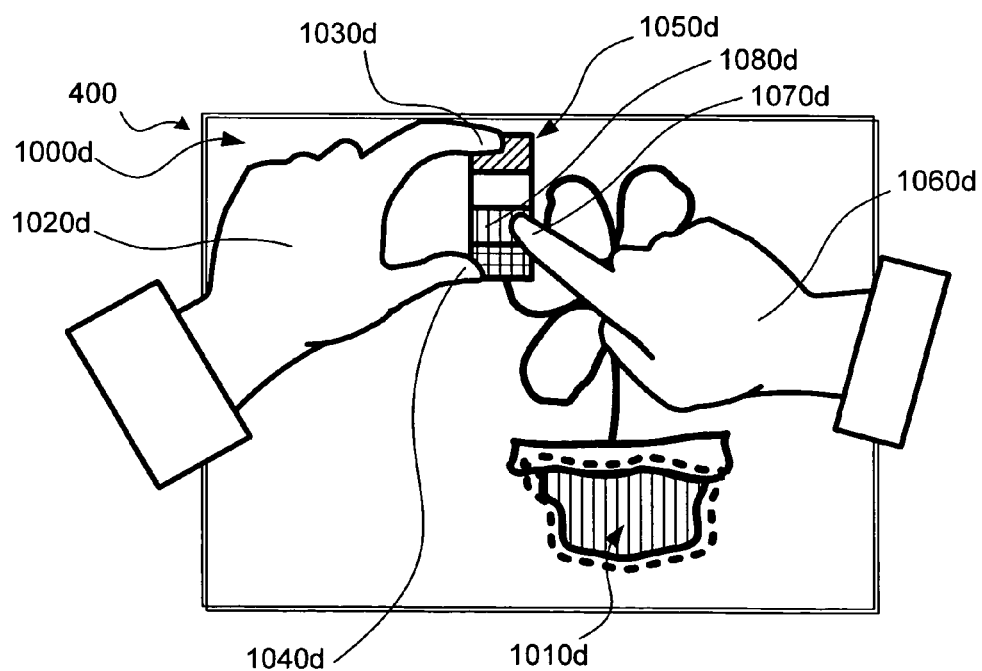

The present invention, therefore, enables a user to control size and, as shown in FIG. 10D, placement of a property selection range 1050d. Property selection range 1050d is presented at a location and size determined by a first finger 1030*d* and a thumb 1040*d* of a user's hand 1020*d*. Wherever property selection range 1050*d* is presented on the interactive display surface, the user can engage property selection range 1050*d* with a second hand 1060*d*. Using a finger 1070*d* on the user's second hand or another physical object, the user can select an attribute 1080*d* from property selection range 1050*d*, thereby changing selected portion 1010*d* of image 1000*d*.

Hierarchical Property Selection Ranges

Figure 11A:
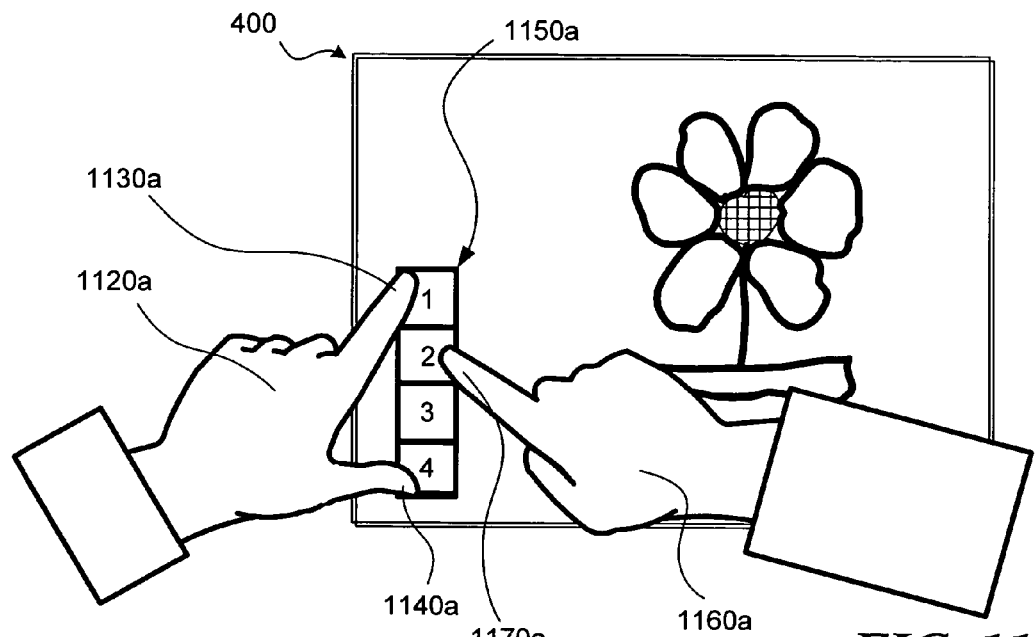
FIGS. 11A-11B illustrate a property selection range having at least one property choice associated with an additional property selection range being manipulated by a user's fingers.
Figure 11B:
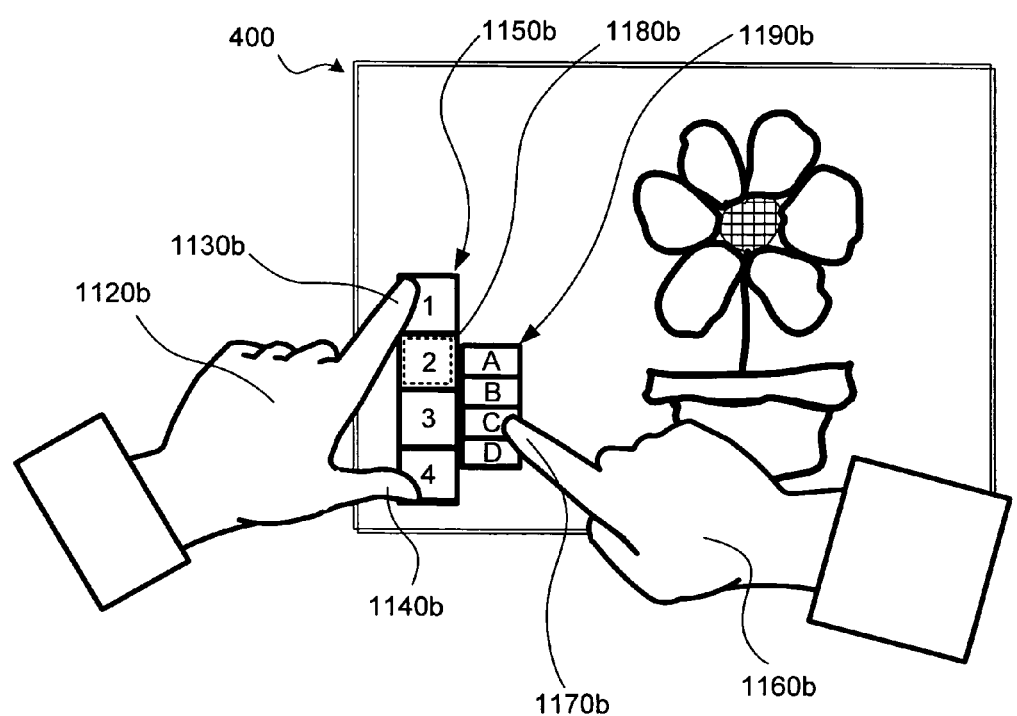

As shown in FIGS. 11A and 11B, property selection ranges are not limited to a single hierarchy or levels of attributes. In FIG. 11A, the user disposes a first finger 1130*a* and a thumb 1140*a* of a first hand 1120*a* adjacent to interactive display surface 400. As a result, property selection range 1150*a* is presented on interactive display surface 400 sized as determined by the distance between first finger 1130*a* and thumb 1140*a*. With a first finger 1170*a* of a second hand 1160*a*, the user engages property selection range 1150*a*. As shown in FIG. 11B, the user's selection of an attribute 1180*b* results in the presentation of a second property selection range 1190*b*. Thus, as a user might direct a cursor with a pointing device through a series of hierarchical menus in a typical graphical user interface program, the user can navigate a hierarchy of menus 1150*b* and 1190*b* called up by user's placement of first finger 1130*b* and thumb 1140*b* of first hand 1120*b*, and by a selection made with first finger 1170*b* of second hand 11160*b*.

Once more, it should be noted that using the present invention, the user is not restricted to using fingers to interact with property selection ranges generated on the interactive display surface. The user can instead employ a wide range of physical objects to interact with interactive display surface 400, and can use such objects to call up and work with property selection ranges having one or more hierarchical levels.

Figure 12:
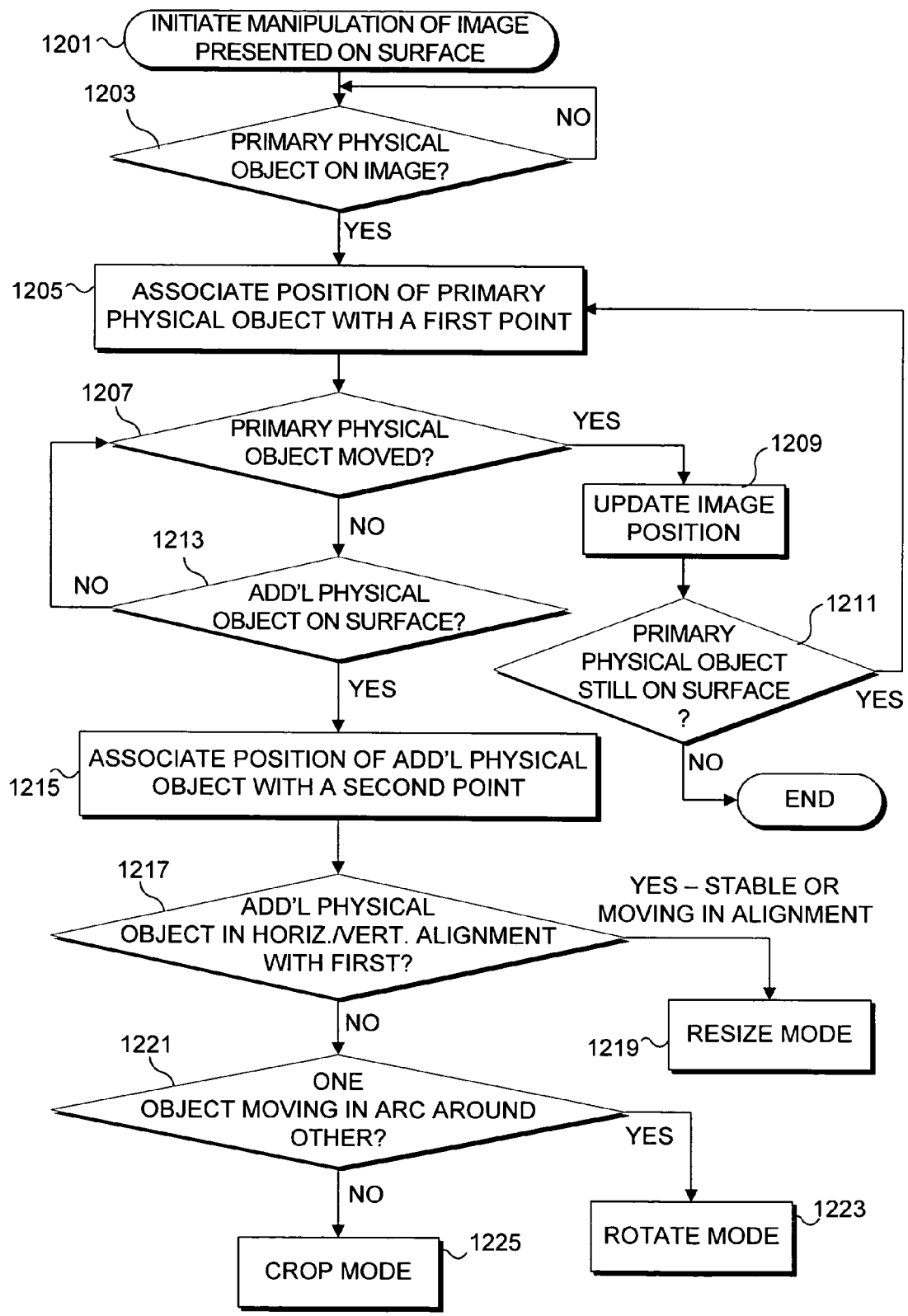
FIG. 12 is a flow diagram illustrating the logical steps regarding manipulation of an image or other virtual entity using one or more physical objects.
Figure 13A:
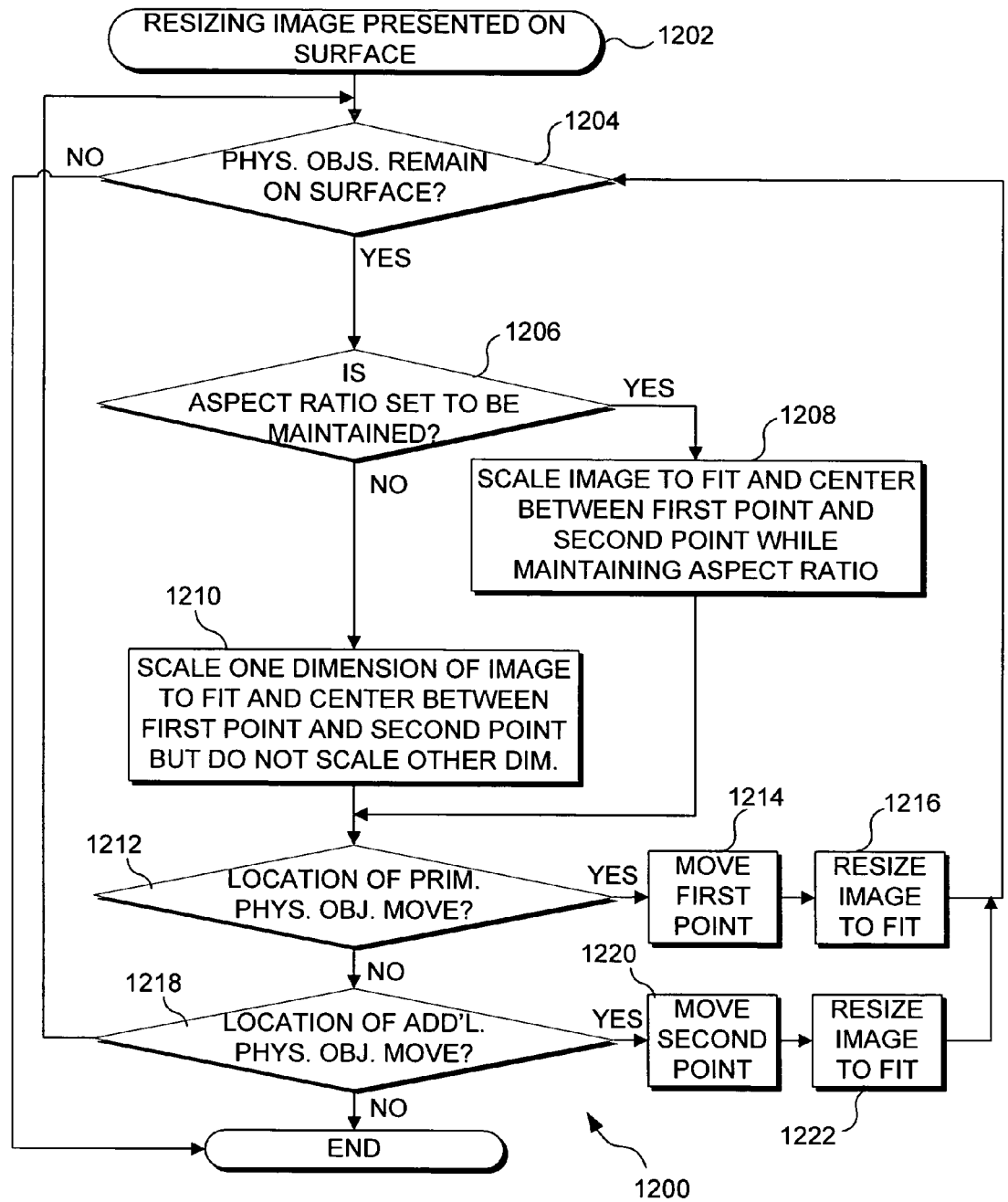
FIG. 13A is a flow diagram illustrating the logical steps for manipulating an image to change its size according to the present invention.
Figure 13B:
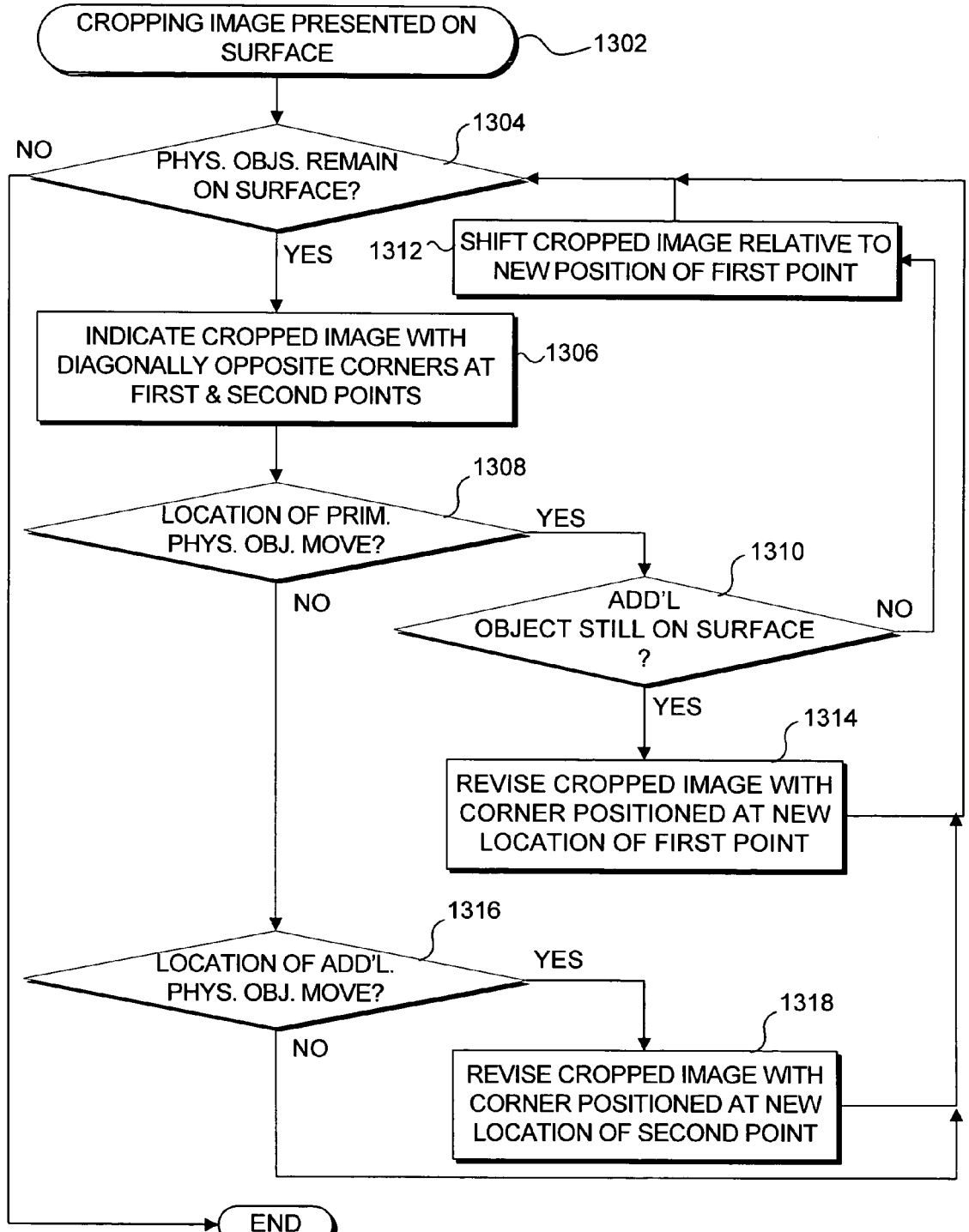
FIG. 13B is a flow diagram illustrating the logical steps for cropping an image according to the present invention.
Figure 14:
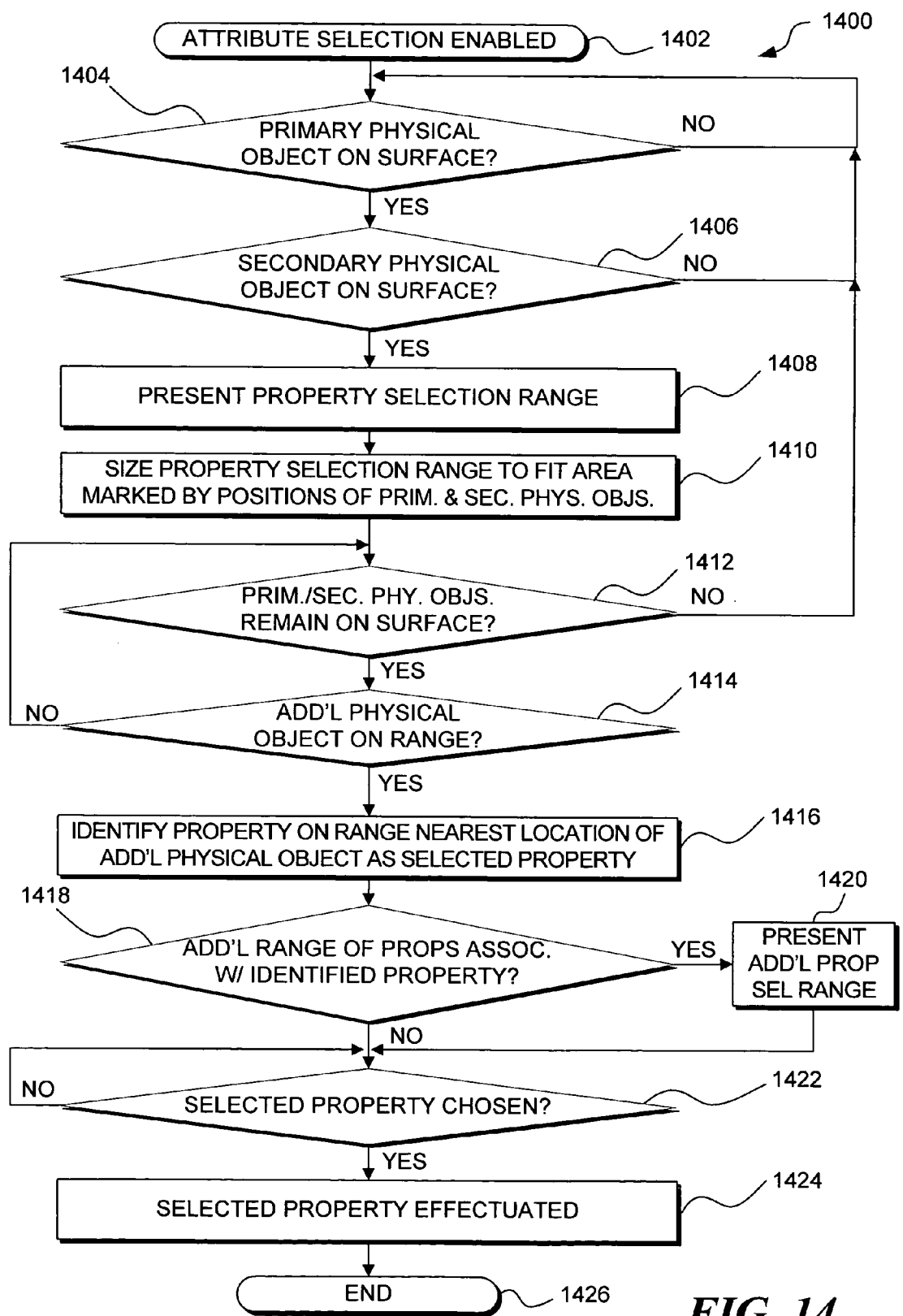
FIG. 14 is a flow diagram illustrating the logical steps for adjusting an attribute of an application according to an embodiment of the present invention.

Logical Steps for Interacting with Interactive Display Surface with Physical Objects FIGS. 12, 13A-13B, and 14 are flow diagrams illustrating the logical steps of engaging an interactive display surface with physical objects to provide input to an application executing on a computer system coupled to an interactive display surface. More particularly, FIGS. 12, 13A and 13B include flow diagrams illustrating the logical steps for interacting with images generated on an interactive display surface as described above in connection with FIGS. 4A through 7C. FIG. 14 includes a flow diagram illustrating the logical steps for interacting with property selection ranges generated by an interactive display surface, as described above in connection with FIGS. 8A through 11B.

FIG. 12 is a flow diagram 1201 illustrating the logical steps for manipulating an image presented on an interactive display surface using one or more physical objects. The flow diagram begins at a step 1201, where the user initiates manipulation of an image (or other type of virtual entity) is presented on the interactive display surface. At a decision step 1203, it is determined if a primary physical object has been disposed adjacent the interactive display surface in the area where the image is presented. In flow diagram 1201, a primary physical object signifies a first physical object to be disposed adjacent the interactive display surface after the image is presented. If it is determined at decision step 1203 that no primary physical object has been disposed adjacent the interactive display surface in the area where the image is presented, the flow diagram loops until an affirmative response occurs. Thus, no actions occur until a user engages the image presented on the interactive display surface with a primary physical object.

If it is determined at decision step 1203 that a primary physical object has been disposed on the image, a step 1205 associated a position of the primary physical object with a first point on the interactive display surface. Next, at a decision step 1207, it is determined if the primary physical object has been moved over the interactive display surface (but not moved away from it). In this case, the logic proceeds with a step 1209, which updates a position of the image by moving the image relative to the interactive display surface so that the new position of the first point remains at the same relative position in the image. A decision step 1211 determines if the primary physical object is still adjacent to the interactive display surface, since if the user has taken the physical object away from, the user has completed the manipulation of the image by moving it to a new location with the physical object, and the logic then ends. If the primary physical object is still on the interactive display surface, the logic then loops back to step 1205.

On the other hand, if it is determined at decision step 1207 that the primary physical object has not been moved, a decision step 1213 provides for determining if an additional physical object has been placed adjacent to the interactive display surface. If not, the logic simply loops back to decision step 1207. Conversely, if an additional object has been placed adjacent to the interactive display surface, a step 1215 associates the position of the additional physical object with a second point on the interactive display surface. The additional physical object may include another finger or another type of object disposed adjacent to the interactive display surface after the primary physical object is disposed on the interactive display surface. Again, as described above, both a primary physical object and an additional physical object are used for resizing and cropping an image on the interactive display surface.

Accordingly, a decision step 1217 determines if the additional physical object has been positioned on the interactive display surface is either general horizontal or vertical alignment with the primary physical object. Clearly, some latitude is built into this test, so that if the primary and additional physical objects are not perfectly horizontally or vertically aligned, the test will still return a positive result. The allowed error in finding such alignment will likely be a few degrees. Horizontal and vertical are preferably determined in regard to the orthogonal X and Y axes of the interactive display surface, but can be predefined in regard to some other reference. If the additional physical object is simply initially positioned in horizontal or vertical alignment with the primary physical object, or if it is then moved generally in the direction of the alignment, it is determined in a step 1219 that the user intends to enter the resize mode, which is illustrated in detail in FIG. 13A.

If the additional physical object is not positioned generally in horizontal or vertical alignment with the primary physical object, a decision step 1221 determines if one the two physical objects is moving in an arc relative to the other, and if so, a step 1223 initiates the rotate mode, which as described above, rotates the image relative to the point that is not moving in the arc, by an extent determined by the angle subtended by the that the moving physical object. If a negative response is returned from decision step 1221, a step 1225 places the interactive display table in the crop mode, which is discussed in greater detail in regard to FIG. 13B.

As noted above, FIG. 13A illustrates the logical steps for resizing an image presented on a surface, as indicated in an initial block 1202. It is assumed that the logic of FIG. 12 has been employed to determine that the user intends to resize an image and that the first and second point for controlling this image manipulation have been determined based upon the positions of the primary physical object and the additional physical object. A decision step 1204 determines if the physical object remains adjacent to the interactive display surface. If so, a decision step 1206 determines if the user has selectively chosen an option (or the option is selected by default) so that the aspect ratio of the image will be retained during any resizing operations of the image. If so, a step 1208 provides for scaling the image so that the image fits and is centered between the first point and the second point, while maintaining the aspect ratio of the original unmodified image. In this step, if the first point and the second point are closer together than the dimension of the image along which the primary and additional physical objects are aligned, the image will be reduced in size, and the ratio of the dimension of the image between the point will be retained relative to the other dimension of the image. Conversely, if the option to not maintain the aspect ratio has been selected, a step 1210 will scale only the dimension along the axis of the alignment between the primary and the additional physical object, so that the image is fitted and centered between the first point and the second point, but the other dimension will not be scaled (as shown in FIGS. 5C and 5D).

After either step 1208 or 1210, a decision step 1212 determines if the location of the primary physical object has moved. If so, a step 1214 moves the first point accordingly. Next, a step 1216 applies the action of either step 1208 or 1210, depending on the setting to maintain the aspect ratio, and resizes the image to fit between the new position of the first point and the position of the second point. Similarly, a decision step 1218 determines if the location of the additional physical object has moved, and if so, the second point is correspondingly moved in a step 1220. A step 1222 resizes the image (again either maintaining the aspect ratio or not, depending upon the result in decision step 1206), based upon the new position of the second point and the position of the first point. After steps 1216 and 1223, the logic returns to decision step 1204. If the additional physical object has not been moved in decision step 1218, the logic ends, it being assumed that the user has removed both of the physical objects from the interactive display surface, which will be the case for a negative response to decision step 1204.

FIG. 13B includes a flow diagram 1300 illustrating the logical steps for cropping an image presented on an interactive display surface. It should be noted that the logical steps illustrated in flow diagram 1300 may be executed in parallel with logical steps illustrated in flow diagram 1200 (FIG. 13A). As described above in connection with flow diagram 1200, flow diagram 1300 assumes that the first and the second points have been determined and that they are not in either horizontal or vertical alignment, indicating that the user intends to crop the image presented on the interactive display surface, as noted in a block 1302.

Flow diagram 1300 proceeds to a decision step 1304, which determines if both physical objects remain on the interactive display surface. If not, the logic ends, since the user may have decided not to crop (or may have completed cropping) the image. If so, the logic indicates the prospective cropped image using the first and second points to define diagonally opposite corners of the cropped image in a step 1306. A decision step 1308 determines if the location of the primary physical object has moved over the interactive display surface. If so, a decision step 1310 determines if the additional object is still on the interactive display surface, and if not, a step 1312 shifts the cropped image relative to a new position of the first point corresponding to the movement of the primary physical object determined in decision step 1308. Thus, this step moves the cropped image section to a different portion of the original image, while retaining its size, the user can move the cropped image area so that a desired portion of the original image is thus within the cropped image that is selected, so long as the primary physical object is not withdrawn from contact with the interactive display surface. After step 1312, the logic therefore returns to decision step 1304.

If it is determined at decision step 1310 that the additional object is still on the interactive display surface, a step 1314 provides for revising the cropped image with the corner corresponding to the first point being moved to the new location of the first point. The logic again then returns to decision step 1304.

If the determination in decision step 1308 is that the location of the physical object has not moved since the position of the first point was last determined, the logic proceeds to a decision step 1316, which determines if the location of the additional physical object has been moved. If so, a step 1318 revised the cropped image with a corner positioned at the new location of the second point. The logic then again loops back to decision step 1304. If the additional physical object was not moved, the logic also loops back to decision step 1304, and the last cropped image that was determined will be used if both of the physical objects are moved away from the interactive display surface.

In flow diagram 1300, the image is not actually cropped at step 1314 until the user indicates that the user has completed cropping the image by removing both physical objects from the interactive display surface. This approach enables the user to continue to see the original image the user is cropping, to assist the user in determining whether the user has cropped the image as desired. Also, as is the case with flow diagram 1200 (FIG. 13A), although the cropping of the image based on movement of the primary and additional physical objects is handled in separate sets of steps, a computer system executing a program following flow diagram 1300 processes the steps very rapidly. Accordingly, even though cropping of the image according to the movements of the physical objects is handled in separate steps, cropping of the image based on the movements of both physical objects effectively occurs simultaneously.

FIG. 14 is a flow diagram 1400 illustrating the logical steps for changing attributes of an application executing on a computer system coupled to an interactive display surface. As described above in connection with FIGS. 8A through 11B, placing a physical object on the interactive display surface presents controls on the interactive display surface that can be used to change a wide range of attributes.

It should be noted that flow chart 1400 illustrates logical steps for presenting a property selection range that fits an area bounded by two physical objects, as described in connection with FIGS. 9A through 11B. Accordingly, unlike the embodiment of the invention illustrated in FIGS. 8A-8F, no property selection range is generated in response to a single physical object being disposed on the interactive display surface, although logical steps of flow chart 1400 could be modified to facilitate this alternative embodiment.

Flow diagram 1400 begins at a step 1402 with enabling interactive display surface attribute selection. As described above, attribute selection may be invoked by a prompt, by user selection of an attribute on the interactive display surface, or in another appropriate manner. Once attribute selection is enabled at step 1402, at a decision step 1404, it is determined if a primary physical object has been disposed adjacent the interactive display surface. If not, the flow diagram loops awaiting an affirmative response to decision step 1404.

Once it is determined at decision step 1404 that a primary physical object has been disposed adjacent to the interactive display surface, at a decision step 1406, it is determined if a second physical object has been disposed adjacent to the interactive display surface. If not, flow diagram 1400 loops awaiting an affirmative response to decision step 1404.

After it is determined at decision step 1406 that a second physical object has been disposed adjacent to the interactive display surface, at a step 1408 a property selection range is presented on the interactive display surface. As described above, the property selection range can be a menu, a palette, a slider control, another virtual control, or any other array of attribute options, depending on the application and context enabling the attribute selection. At a step 1410, the property selection range is sized to fit the area determined by the locations of the primary and secondary physical objects.

Once the property selection range is presented and sized, at a decision step 1412, it is determined if the primary and secondary physical objects remain disposed adjacent the interactive display surface. If either or both of the physical objects are removed from adjacent the interactive display surface, it is assumed that the user has discontinued or finished the attribute selection, and flow diagram 1400 returns to decision step 1404 to await a primary physical object once more being disposed adjacent the interactive display surface. On the other hand, if it is determined at decision step 1412 that the primary and secondary physical objects remain disposed adjacent the interactive display surface, flow diagram 1400 proceeds to a decision step 1414, where it is determined if an additional physical object is disposed adjacent the interactive display surface in the area where the property selection range is generated. As described above in connection with FIGS. 10A-10D, the primary and secondary physical objects, such as a finger and thumb of a user's first hand, define the property selection range, while an additional physical object, such as a finger of the user's other hand, is used to make a selection from the property selection range. If it is determined at decision step 1414 that no additional physical object has been disposed adjacent the interactive display surface within the property selection range, flow diagram 1400 loops to decision step 1412.

On the other hand, once it is determined at decision step 1414 that an additional physical object has been disposed adjacent the interactive display surface, at a step 1416 a property included in the property selection range nearest a location where the additional physical object is disposed is identified. At a decision step 1418, it is determined if an additional range of properties, such as a sub-menu described in connection with FIGS. 11A and 11B, is associated with the property identified at step 1416. If so, the additional property selection range is presented on the interactive display surface.

Once it is determined that no additional property selection range is associated with the identified property at decision step 1418 or the additional property selection range has been presented at step 1420, at a decision step 1422, it is determined if a selected property has been chosen. A selected property may be chosen by indicating it with the additional physical object and then removing the additional physical object from adjacent the interactive display surface. A selected property may also be chosen by tapping the selected property, or in a number of other ways. Once it is determined at decision step 1422 that the selected property has been chosen, at a step 1424, the selected property is effectuated by changing the attribute associated with the selected property or otherwise responding to the selected property. Flow diagram 1400 ends at a step 1426.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. In a computing environment including a computer system and an interactive display surface, a method for manipulating attributes of an object in a software application by providing physical inputs via the interactive display surface, the method comprising the steps of:
   (a) executing the software application on the computer system, the application having at least one object with attributes that can be adjusted during execution of the application based on physical inputs inputted by a computer system user, wherein the positioning of the physical inputs relative to the visual depiction of the object on the interactive display surface determines the manner in which the attributes are to be adjusted, such that two of the same physical inputs can initiate different attribute adjustments without altering application input configuration settings based on where the two inputs are positioned relative to the visual depiction of the object on the interactive display surface;
   (b) determining a primary location adjacent to the interactive display surface where a primary physical object has been positioned by a user;
   (c) determining a second location adjacent to the interactive display surface where a second physical object has been positioned by a user, the primary location and the secondary location forming a physical object layout on the interactive display surface;
   (d) determining, based on the physical object layout, the order in which the primary and second physical objects were placed and the positioning of the physical inputs relative to the visual depiction of the object on the interactive display surface, which type of operation is to be initiated to adjust the attributes of the object, the operation type being variable and selectable from a plurality of operation types corresponding to various object layouts, wherein the same physical inputs can initiate different attribute adjustments without altering application input configuration settings based on where the two inputs are positioned relative to the object;
   (e) detecting a change in position of at least one of the primary location and the second location; and
   (f) initiating the determined type of operation to adjust the attribute according to the change in at least one of the primary and the second location, the change corresponding to at least one of the first and the second position.

2. The method of claim 1, wherein the steps of determining the primary location, the second location, and the change in position of at least one of the primary location and the second location comprise the steps of:
   (a) transmitting infrared (IR) light through the interactive display surface toward a face of the interactive display surface adjacent to which the primary physical object and the secondary physical object are disposed;
   (b) detecting the primary location by sensing IR light reflected from the primary physical object when the primary object has been positioned adjacent to the interactive display surface;

(c) detecting the second location by sensing IR light reflected from the second physical object when the secondary object has been positioned adjacent to the interactive display surface; and (d) detecting the change in position of at least one of the primary location and the second location by determining any change in position of the primary physical object and the secondary physical object, based upon the IR light that was sensed.

3. The method of claim 1, wherein at least one of the primary physical object and the second physical object includes a digit on one of a user's hands.

4. The method of claim 1, wherein the attribute includes a size of a virtual entity displayed on the interactive display surface, and the step of adjusting the attribute comprises the steps of:

(a) determining that one of the primary location and the second location is disposed at one of a boundary of the virtual entity and within the virtual entity;

(b) determining that the primary location and the second location are disposed in one of a substantially vertical alignment and a substantially horizontal alignment with each other; and (c) resizing the virtual entity so that its extents in at least one dimension are defined by the primary location and the second location, a center of the virtual entity being positioned at a midpoint between the primary location and the second location.

5. The method of claim 4, wherein the virtual entity comprises an image.

6. The method of claim 4, wherein an aspect ratio of the virtual entity is preserved as the size of the virtual entity is changed.

7. The method of claim 4, wherein an aspect ratio of the virtual entity is changed as the size of the virtual entity is changed.

8. The method of claim 1, wherein the attribute includes a portion of a virtual entity displayed on the interactive display surface, and the step of adjusting the attribute comprises the steps of:

(a) determining that one of the primary location and the second location is disposed at one of a boundary of the virtual entity and within the virtual entity;

(b) determining that the primary location and the second location are disposed neither in a substantially vertical alignment nor a substantially horizontal alignment with each other; and (c) cropping the virtual entity to eliminate all but a portion of the virtual entity with diagonally opposite corners corresponding to the primary location and the second location.

9. The method of claim 1, wherein the step of adjusting the attribute comprises the steps of:

(a) presenting a property selection range adjacent to the primary location, the property selection range including a range of property options within the property selection range;

(b) associating the second location with a property option selected from the range of property options, the property option selected being a property option closest to the second location; and (c) adjusting the attribute in accordance with the property option selected.

10. The method of claim 9, further comprising the steps of:

(a) detecting a secondary location adjacent to the interactive display surface where a secondary physical object has been disposed; and (b) adjusting a size of the property selection range to generally fit a space defined by the primary location and the secondary location.

11. The method of claim 10, wherein the primary physical object and the secondary physical object include digits on a user's hand.

12. The method of claim 11, wherein the second object includes a digit on a user's hand.

13. The method of claim 1, wherein the step of adjusting the attribute further comprises the steps of:

(a) presenting a property selection range adjacent to the primary location, the property selection range including a range of property options within the property selection range;

(b) associating the second location with a property option selected from the range of property options, the property option selected being closest to the second location;

(c) presenting an additional property selection range adjacent to the property selected, the additional property selection range including a range of additional property options associated with the property option selected, which are within the additional property selection range;

(d) associating an additional property option selected among the range of additional property options with a changed second location, the additional property option selected being closest to the changed second location; and (e) adjusting the attribute in accordance with the additional property option selected.

14. A method for adjusting a presentation of an image on an interactive display surface that is coupled to a computer system, comprising the steps of:

(a) executing an image presentation application on the computer system, the image presentation application presenting at least one image on the interactive display surface, the image having attributes that can be adjusted based on physical inputs inputted by a computer system user, wherein the positioning of the physical inputs relative to the visual depiction of the image on the interactive display surface determines the manner in which the attributes are to be adjusted, such that two of the same physical inputs can initiate different attribute adjustments without altering application input configuration settings based on where the two inputs are positioned relative to the visual depiction of the image on the interactive display surface;

(b) determining a primary location adjacent to the interactive display surface where a primary physical object has been disposed;

(c) determining a second location adjacent to the interactive display surface where a second physical object has been disposed, the primary location and the secondary location forming an object layout on the interactive display surface;

(d) determining, based on the physical object layout, the order in which the primary and second physical objects were placed and the positioning of the physical inputs relative to the visual depiction of the image on the interactive display surface, which type of operation is to be initiated to adjust the boundaries of the image the operation type being variable and selectable from a plurality of operation types corresponding to various object layouts, wherein the same physical inputs can initiate different attribute adjustments without altering application input configuration settings based on where the two inputs are positioned relative to the visual depiction of the image on the interactive display surface;

(e) detecting any change in a position of at least one of the primary location and the second location; and (f) initiating the determined type of operation to adjust the Previously Presented boundaries of the image according to the change in at least one of the primary and the second location, the change corresponding to at least one of the first and the second position.

15. The method of claim 14, wherein the steps of determining the primary location, the second location, and the change in position of at least one of the primary location and the second location comprise the steps of:

(a) transmitting infrared (IR) light through the interactive display surface toward a face of the interactive display surface adjacent to which the primary physical object and the secondary physical object are disposed;

(b) detecting the primary location by sensing IR light reflected from the primary physical object when the primary object has been positioned adjacent to the interactive display surface;

(c) detecting the second location by sensing IR light reflected from the second physical object when the secondary object has been positioned adjacent to the interactive display surface; and (d) detecting the change in position of at least one of the primary location and the second location by determining any change in position of the primary physical object and the secondary physical object, based upon the IR light that was sensed.

16. The method of claim 14, wherein at least one of the primary physical object and the second physical object includes a digit on one of a user's hands.

17. The method of claim 14, wherein the step of associating Previously Presented boundaries of the image comprises the step of changing a size of the image by:

(a) determining that the primary location and the second location are generally one of vertically aligned and horizontally aligned with each other;

(b) setting opposite boundaries of the image to correspond with the primary location and the second location, respectively; and (c) moving at least one Previously Presented boundary of the image to correspond with any change in the position of the primary location and an opposite Previously Presented boundary to correspond with any change in position of the second location, to change the size of the image.

18. The method of claim 17, wherein a center of the image remains at a midpoint between the primary location and the second location as any change in at least one of the primary location and the second location occurs.

19. The method of claim 14, wherein an aspect of the ratio of the image is preserved as the size of the image is changed.

20. The method of claim 14, wherein an aspect ratio of the image is changed as the size of the image is changed.

21. The method of claim 14, further comprising the step of changing a portion of the image displayed on the interactive display surface by:

(a) determining that the primary location and the second location are neither generally vertically aligned nor generally horizontally aligned with each other;

(b) forming Previously Presented image boundaries with diagonally opposite corners corresponding to the primary location and the second location, respectively;

(c) adjusting at least one of the diagonally opposite corners to correspond to any change in the position of at least one of the primary location and the second location; and (d) cropping the image to eliminate all but the portion of the image bounded by the Previously Presented image boundary.

22. A method for providing input to an application executing on a computer system coupled to an interactive display surface, comprising the steps of:

(a) executing an application on the computer system, the application having at least one object with attributes that can be adjusted during execution of the application based on physical inputs inputted by a computer system user, wherein the positioning of the physical inputs relative to the visual depiction of the object on the interactive display surface determines the manner in which the attributes are to be adjusted, such that two of the same physical inputs can initiate different attribute adjustments without altering application input configuration settings based on where the two inputs are positioned relative to the visual depiction of the object on the interactive display surface;

(b) determining a primary location adjacent to the interactive display surface where a primary physical object has been disposed;

(c) presenting a property selection range adjacent to the primary location, the property selection range including a range of property options within the property selection range;

(d) determining a second location adjacent to the interactive display surface where a second physical object has been disposed, the primary location and the secondary location forming an object layout on the interactive display surface;

(e) determining, based on the physical object layout, the order in which the primary and second physical objects were placed and the positioning of the physical inputs relative to the visual depiction of the object on the interactive display surface, which type of operation is to be initiated to adjust the attributes of the object, the operation type being variable and selectable from a plurality of operation types corresponding to various object layouts, wherein the same physical inputs can initiate different attribute adjustments without altering application input configuration settings based on where the two inputs are positioned relative to the object; and (f) adjusting the attribute in accordance with the selected property option.

23. The method of claim 22, wherein the steps of determining the primary location, the second location, and the change in position of at least one of the primary location and the second location, comprise the steps of:

(a) transmitting infrared (IR) light through the interactive display surface toward a face of the interactive display surface adjacent to which the primary physical object and the secondary physical object are disposed;

(b) detecting the primary location by sensing IR light reflected from the primary physical object when the primary object has been disposed adjacent to the interactive display surface;

(c) detecting the second location by sensing IR light reflected from the second physical object when the secondary object has been disposed adjacent to the interactive display surface; and (d) detecting any change in position of at least one of the primary location and the second location by determining any change in the primary location and the second location, by determining any change in position of the primary physical object and the secondary physical object, based upon the IR light that was sensed.

24. The method of claim 22, further comprising the steps of: (a) determining a secondary location adjacent to the interactive display surface where a secondary physical object has been disposed; and (b) adjusting a size of the property selection range to generally fit a space defined by the primary location and the secondary location.

25. The method of claim 24, wherein the primary physical object, the second physical object, and the secondary physical object include digits on a user's hand.

26. The method of claim 22, wherein the step of adjusting the attribute comprises the steps of:
(a) presenting a property selection range adjacent to the primary location, the property selection range including a range of property options within the property selection range;
(b) associating the second location with a property option selected among the range of property options, the property option being closest to the second location;
(c) presenting an additional property selection range adjacent to the property option selected, the additional property selection range including a range of additional property options associated with the property option selected, and included within the additional property selection range;
(d) associating an additional property option selected from the range of additional property options with a changed second location, the additional property option selected being closest to the changed second location; and
(e) adjusting the attribute in accordance with the additional property option selected.

27. A system for providing input to an application that is being executed, comprising:
(a) an interactive display surface adjacent to which a physical object is manipulated, said interactive display surface diffusing light, and having a processing side and an interactive side from which the image is viewed and adjacent to which the physical object can be disposed, the processing side being opposite to the interactive side;
(b) a projector that projects virtual entities onto the processing side of the interactive display surface, said virtual entities being visible from the interactive side;
(c) a light source disposed on the processing side of the interactive display surface, the light source emitting infrared (IR) light that is transmitted through the interactive display surface to the interactive side and reflected back through the interactive display surface by the physical object that is disposed adjacent to the interactive side of the interactive display surface;
(d) a light sensor disposed on the processing side of the interactive display surface, the light sensor sensing IR light reflected back from the physical object through the interactive display surface and imaging the interactive display surface to detect the physical object and its location;
(e) a processor in communication with the light sensor and the projector; and
(f) a memory in communication with the processor, the memory storing data and machine instructions that cause the processor to carry out a plurality of functions, including:
(i) executing an application on the computer system, the application having at least one object with attributes that can be changed during execution of the application based on physical inputs inputted by a computer system user, wherein the positioning of the physical inputs relative to the visual depiction of the object on the interactive display surface determines the manner in which the attributes are to be adjusted, such that two of the same physical inputs can initiate different attribute adjustments without altering application input configuration settings based on where the two inputs are positioned relative to the visual depiction of the object on the interactive display surface;
(ii) determining a primary location adjacent to the interactive display surface where a primary physical object has been positioned by a user;
(iii) determining a second location adjacent to the interactive display surface where a second physical object has been positioned by a user, the primary location and the secondary location forming a physical object layout on the interactive display surface;
(iv) determining, based on the physical object layout, the order in which the primary and second physical objects were placed and the positioning of the physical inputs relative to the visual depiction of the object on the interactive display surface, which type of operation is to be initiated to adjust the attributes of the object, the operation type being variable and selectable from a plurality of operation types corresponding to various object layouts, wherein the same physical inputs can initiate different attribute adjustments without altering application input configuration settings based on where the two inputs are positioned relative to the object;
(v) detecting a change in position of at least one of the primary location and the second location; and
(vi) initiating the determined type of operation to adjust the attribute according to the change in at least one of the primary and the second location, the change corresponding to at least one of the first and the second position.

28. The system of claim 27, wherein at least one of the primary physical object and the second physical object includes a digit on one of a user's hands.

29. The system of claim 27, wherein the attribute includes a size of the virtual entity displayed on the interactive display surface, and the machine language instructions further cause the processor to:
(a) determine that one of the primary location and the second location is disposed at one of a boundary of the virtual entity and within the virtual entity;
(b) determine that the primary location and the second location are disposed in one of a substantially vertical alignment and a substantially horizontal alignment with each other; and
(c) resize the virtual entity so that its extents in at least one dimension are defined by the primary location and the second location, a center of the virtual entity being positioned at a midpoint between the primary location and the second location.

30. The system of claim 29, wherein the virtual entity comprises an image.

31. The system of claim 29, wherein the machine language instructions further cause the processor to preserve an aspect ratio of the virtual entity as the size of the virtual entity is changed.

32. The system of claim 29, wherein the machine language instructions further cause the processor to change an aspect ratio of the virtual entity as the size of the virtual entity is changed.

33. The system of claim 27, wherein the attribute includes a portion of a virtual entity displayed on the interactive display surface, and the machine language instructions further cause the processor to (a) determine that one of the primary location and the second location is disposed at one of a boundary of the virtual entity and within the virtual entity;

(b) determine that the primary location and the second location are disposed neither in a substantially vertical alignment nor a substantially horizontal alignment with each other; and (c) crop the virtual entity to eliminate all but a portion of the virtual entity with diagonally opposite corners corresponding to the primary location and the second location.

34. The system of claim 27, wherein the machine language instructions further cause the processor to:

(a) present a property selection range adjacent to the primary location, the property selection range including a range of property options within the property selection range;

(b) associate the second location with a property option selected from the range of property options, the property option selected being closest to the second location; and (c) adjust the attribute in accordance with the property option selected.

35. The system of claim 34, wherein the machine language instructions further cause the processor to:

(a) detect a secondary location adjacent to the interactive display surface where a secondary physical object has been disposed; and (b) adjust a size of the property selection range to generally fit a space defined by the primary location and the secondary location.

36. The system of claim 35, wherein the primary physical object and the secondary physical object include digits on a user's hand.

37. The system of claim 35, wherein the second physical object includes a digit on a user's hand.

38. The system of claim 27, wherein the machine language instructions further cause the processor to:

(a) present a property selection range adjacent to the primary location, the property selection range including a range of property options within the property selection range;

(b) associate the second location with a property option selected from the range of property options, the property option selected being closest to the second location;

(c) present an additional property selection range adjacent to the property option selected, the additional property selection range including a range of additional property options associated with the property option selected, and included in the additional property selection range;

(d) associate an additional property option selected from the range of additional property option with a changed second location, the additional property option selected being closest to the changed second location; and (e) adjust the attribute in accordance with the additional property option selected.

39. A system for adjusting a presentation of an image, comprising:

(a) an interactive display surface adjacent to which a physical object is manipulated, said interactive display surface diffusing light, and having a processing side and an interactive side from which the image is viewed and adjacent to which the physical object can be placed, the processing side being opposite to the interactive side;

(b) a projector that projects graphic images onto the processing side of the interactive display surface, said graphic images being visible from the interactive side;

(c) a light source disposed on the processing side of the display surface, the light source emitting infrared (IR) light that is transmitted through the display surface to the interactive side and reflected back through the interactive display surface by the physical object that is disposed adjacent to the interactive side of the interactive display surface;

(d) a light sensor disposed on the processing side of the interactive display surface, the light sensor sensing IR light reflected back from the physical object through the interactive display surface and imaging the interactive display surface to detect the physical object and its location;

(e) a processor in communication with the light sensor and the projector; and (f) a memory in communication with the processor, the memory storing data and machine instructions that cause the processor to carry out a plurality of functions, including:

(i) executing an image presentation application on the computer system, the image presentation application presenting at least one image on the interactive display surface using the projector, the image having attributes that can be adjusted based on physical inputs inputted by a computer system user, wherein the positioning of the physical inputs relative to the visual depiction of the image on the interactive display surface determines the manner in which the attributes are to be adjusted, such that two of the same physical inputs can initiate different attribute adjustments without altering application input configuration settings based on where the two inputs are positioned relative to the visual depiction of the image on the interactive display surface;

(ii) using the light sensor for determining a primary location adjacent to the interactive display surface where a primary physical object has been disposed;

(iii) using the light sensor for determining a second location adjacent to the interactive display surface where a second physical object has been disposed, the primary location and the secondary location forming an object layout on the interactive display surface;

(iv) determining, based on the physical object layout, the order in which the primary and second physical objects were placed and the positioning of the physical inputs relative to the visual depiction of the image on the interactive display surface, which type of operation is to be initiated to adjust the attributes of the object, the operation type being variable and selectable from a plurality of operation types corresponding to various object layouts, wherein the same physical inputs can initiate different attribute adjustments without altering application input configuration settings based on where the two inputs are positioned relative to the image;

(v) using the light sensor for detecting any change in a position of at least one of the primary location and the second location; and (vi) initiating the determined type of operation to adjust the Previously Presented boundaries of the image according to the change in at least one of the primary and the second location, the change corresponding to at least one of the first and the second position.

40. The system of claim 39, wherein at least one of the primary physical object and the second physical object includes a digit on one of a user's hands.

41. The system of claim 39, wherein the attribute includes a size of an image displayed on the interactive display surface, and the machine language instructions further cause the processor to:
(a) determine that the primary location and the second location are generally one of vertically aligned and horizontally aligned with each other;
(b) set opposite boundaries of the image to correspond with the primary location and the second location, respectively; and
(c) move at least one Previously Presented boundary of the image to correspond with any change in the position of the primary location and an opposite Previously Presented boundary to correspond with any change in position of the second location, to change the size of the image.

42. The system of claim 41, wherein a center of the image remains at a midpoint between the primary location and the second location as any change in at least one of the primary location and the second location occurs.

43. The system of claim 41, wherein the machine language instructions further cause the processor to preserve an aspect ratio of the image as the size of the image is changed.

44. The system of claim 41, wherein the machine language instructions further cause the processor to change an aspect ratio of the image as the size of the image is changed.

45. The system of claim 39, wherein the attribute includes a portion of an image displayed on the interactive display surface, and the machine language instructions further cause the processor to:
(a) determine that the primary location and the second location are neither generally vertically aligned nor generally horizontally aligned with each other;
(b) form Previously Presented image boundaries with diagonally opposite corners corresponding to the primary location and the second location, respectively;
(c) adjust at least one of the diagonally opposite corners to correspond to any change in the position of at least one of the primary location and second location; and
(d) crop the image to eliminate all but the portion of the image bounded by the Previously Presented image boundary.

46. In a computing environment including a computer system and an interactive display surface, a method for rotating an image in a software application by providing physical inputs via the interactive display surface, the method comprising the steps of:
(a) executing the software application on the computer system, the application having at least one image with attributes that can be adjusted during execution of the application based on physical inputs inputted by a computer system user, wherein the positioning of the physical inputs relative to the visual depiction of the image on the interactive display surface determines the manner in which the attributes are to be adjusted, such that two of the same physical inputs can initiate different attribute adjustments without altering application input configuration settings based on where the two inputs are positioned relative to the visual depiction of the image on the interactive display surface;
(b) determining a primary location adjacent to the interactive display surface where a primary physical object has been positioned by a user;
(c) determining a second location adjacent to the interactive display surface where a second physical object has been positioned by a user, the primary location and the secondary location forming a physical object layout on the interactive display surface;
(d) determining, based on the physical object layout, the order in which the primary and second physical objects were placed and the positioning of the physical inputs relative to the visual depiction of the image on the interactive display surface, which type of operation is to be initiated to adjust the attributes of the object, the operation type being variable and selectable from a plurality of operation types corresponding to various object layouts, wherein the same physical inputs can initiate different attribute adjustments without altering application input configuration settings based on where the two inputs are positioned relative to the image;
(e) detecting a change in position of at least one of the primary location and the second location; and
(f) initiating the determined type of operation to rotate the image according to the change in at least one of the primary and the second location, the change corresponding to at least one of the first and the second position.

47. The method of claim 1, further comprising upon determining type of operation that is to be performed, displaying dynamic feedback to the user representing the type of operation that is to be performed as a result of the placement of the second physical object.

* * * * *